(12) United States Patent
Kelly et al.

(10) Patent No.: US 12,174,604 B2
(45) Date of Patent: Dec. 24, 2024

(54) SYSTEMS AND METHODS FOR ACCELERATED COMPUTATIONS IN DATA-DRIVEN ENERGY MANAGEMENT SYSTEMS

(71) Applicant: BluWave Inc., Ottawa (CA)

(72) Inventors: Owen Kelly, Ottawa (CA); Nasrin Sadeghianpourhamami, Richmond Hill (CA); Mostafa Farrokhabadi, Ottawa (CA)

( * ) Notice: Subject to any disclaimer, the term of this patent is extended or adjusted under 35 U.S.C. 154(b) by 485 days.

(21) Appl. No.: 17/371,398

(22) Filed: Jul. 9, 2021

(65) Prior Publication Data

US 2023/0009568 A1 Jan. 12, 2023

(51) Int. Cl.
G05B 19/042 (2006.01)
G06N 20/00 (2019.01)

(52) U.S. Cl.
CPC .......... *G05B 19/042* (2013.01); *G06N 20/00* (2019.01); *G05B 2219/2639* (2013.01)

(58) Field of Classification Search
CPC .......... G05B 19/042; G05B 2219/2639; G05B 13/048; G06N 20/00; B60L 2240/545; B60L 2260/50; B60L 2270/44; B60L 53/66; B60L 53/665; B60L 53/68; B60L 55/00; B60L 58/12; B60L 58/16; Y02T 10/70; Y02T 10/7072
See application file for complete search history.

(56) References Cited

U.S. PATENT DOCUMENTS

2020/0114926 A1* 4/2020 Liu ................. G06N 20/00
2021/0276447 A1* 9/2021 Kumar ................ B60L 53/66
2022/0095879 A1* 3/2022 Ellingson .......... A47L 15/0021

FOREIGN PATENT DOCUMENTS

CN 105098852 A * 11/2015

OTHER PUBLICATIONS

English Translation of foreign patent CN-105098852.*
(Continued)

*Primary Examiner* — Charles R Kasenge
(74) *Attorney, Agent, or Firm* — Borden Ladner Gervais LLP

(57) ABSTRACT

Improvements in computer-based energy asset management technologies are provided. An energy asset management system with a data summarization mechanism can perform computations, for example relating to controlling the assets, which may include electric vehicles (EVs), with fewer computing resources. Further, the system can perform computations on large datasets where such computations would have otherwise been impractical with conventional systems due to the size of the data. A large dataset relating to the energy asset management system is reduced using the summarization mechanism, and a computation model is trained using the reduced dataset. Energy assets in the system may be controlled using the trained computational model. Assets may include EVs, and controlling the EVs may be based on generated predictions relating to charging interactions. The predictions may be based on road traffic information and/or weather related information. Further, the computational model may include an optimizer for scheduling charging interactions of EVs.

20 Claims, 4 Drawing Sheets

(56) References Cited

OTHER PUBLICATIONS

Fedus et al., "Revisiting Fundamentals of Experience Replay," Proceedings of Machine Learning Research, 2020, 11 pages.

Krause and Guestrin.,"Beyond Convexity—Submodularity in Machine Learning," International Conference on Machine Learning, Jul. 2008, 150 pages.

Liu and Vondrak., "Submodular Optimization in the MapReduce Model," 2018.

Matiisen., "Demystifying Deep Reinforcement Learning," Computational Neuroscience Lab, Dec. 2015, 17 pages.

Mirzasoleiman et al., "Coresets for Data-efficient Training of Machine Learning Models," Proceedings of the 37 th International Conference on Machine Learning, 2020, 15 pages.

Mitrovic et al., "Data Summarization at Scale: A Two-Stage Submodular Approach," Yale Institute for Network Science, 2018, pp. 1-24.

Mitrovic et al., "Streaming Robust Submodular Maximization: A Partitioned Thresholding Approach," 2017, 1 page.

Tschiatschek et al., "Learning Mixtures of Submodular Functions for Image Collection Summarization," NeurIPS Proceedings, 2014, pp. 1-9.

Vondrák., "Optimization of Submodular Functions Tutorial—lecture I ," IBM Almaden Research Center, 2012, 65 pages.

\* cited by examiner

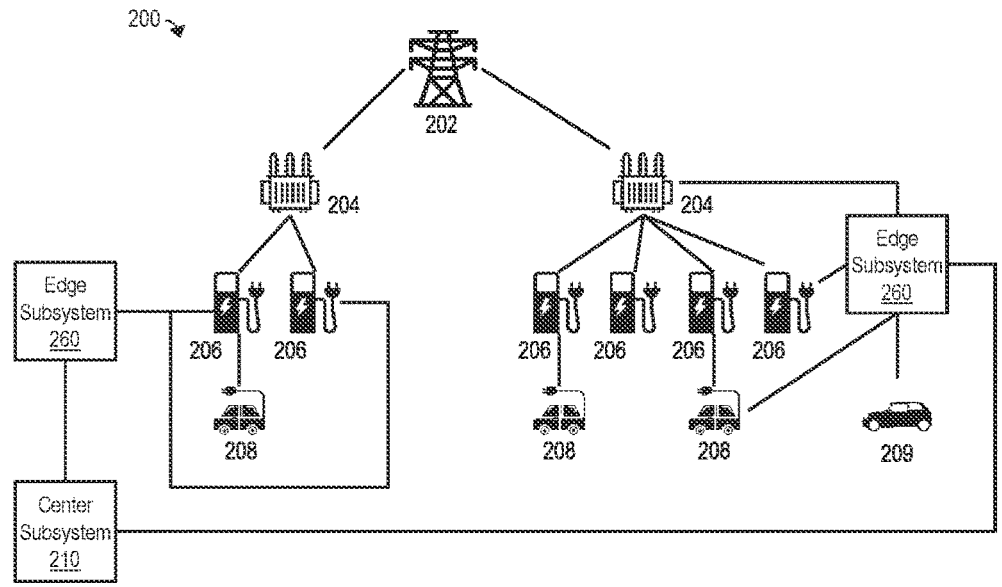

FIG. 2

| Predictor Data Summarization process example |
| --- |
| Numerical example of summarization method or algorithm. |

| Signal # | Module | Inputs / Outputs | Example values |
| --- | --- | --- | --- |
| 4 | Predictor Data repository 116 | Input: A set of n samples of (feature, label) | $n = 4$ samples (3, 7) (3.2, 7.1) (4, 5) (9, 5) |
| 11 | Summarization config 126 | Input: Summary size m | $m = 3$ |
| 5 | Reduced Predictor Data repository 118 | Output: A set of m "exemplars" like (feature, label, weight) | (3, 7, 2) (4, 5, 1) (9, 5, 1) # sample = 3 = m |

Process: Sample (3,7) is chosen as exemplar for the 2 samples (3,7) and (3.2, 7.1).
That is represented in output as feature=[3], label=[7], weight 2.

FIG. 3

SYSTEMS AND METHODS FOR ACCELERATED COMPUTATIONS IN DATA-DRIVEN ENERGY MANAGEMENT SYSTEMS

FIELD

The present disclosure relates to energy management systems.

BACKGROUND

The electric power grid is called to meet power demands that are increasing and changing, driven by technology trends such as the proliferation of battery powered electric vehicles, and distributed generation assets. At the same time, measurement systems and communications systems make it possible to have comprehensive measurements of the state of infrastructure and assets throughout the electrical generation and distribution network.

The application context is an energy asset management system that exists to perform operational control of a distributed collection of energy assets. The energy asset management system steers the collective state of the energy assets toward a real-world objective. This objective-seeking strategy is called optimization because the objective may be expressed as a numerical figure of merit to be maximized or minimized.

In any timeframe, there are control actions, for example decisions, that are selected and applied to the assets, and new information available about the state of the physical world, state of the market, and state of the assets, for example measurements. The system may continually solve a decision problem that accepts measurements as input and generates decisions as output. For proper functioning, some assets require their next control input to be delivered on a time deadline.

Improvements relating to the performance of energy management systems are desired.

The above information is presented as background information only to assist with an understanding of the present disclosure. No assertion or admission is made as to whether any of the above, or anything else in the present disclosure, unless explicitly stated, might be applicable as prior art with regard to the present disclosure.

BRIEF DESCRIPTION OF THE DRAWINGS

Example embodiments of the present disclosure will now be described with reference to the attached Figures.

FIG. 2 is a diagram of an example system comprising an electric utility with a distribution network, electrical substations, electric charging stations, and electric vehicles.

FIG. 3 is a table providing an example demonstrating a general concept of summarization.

Figure 1:
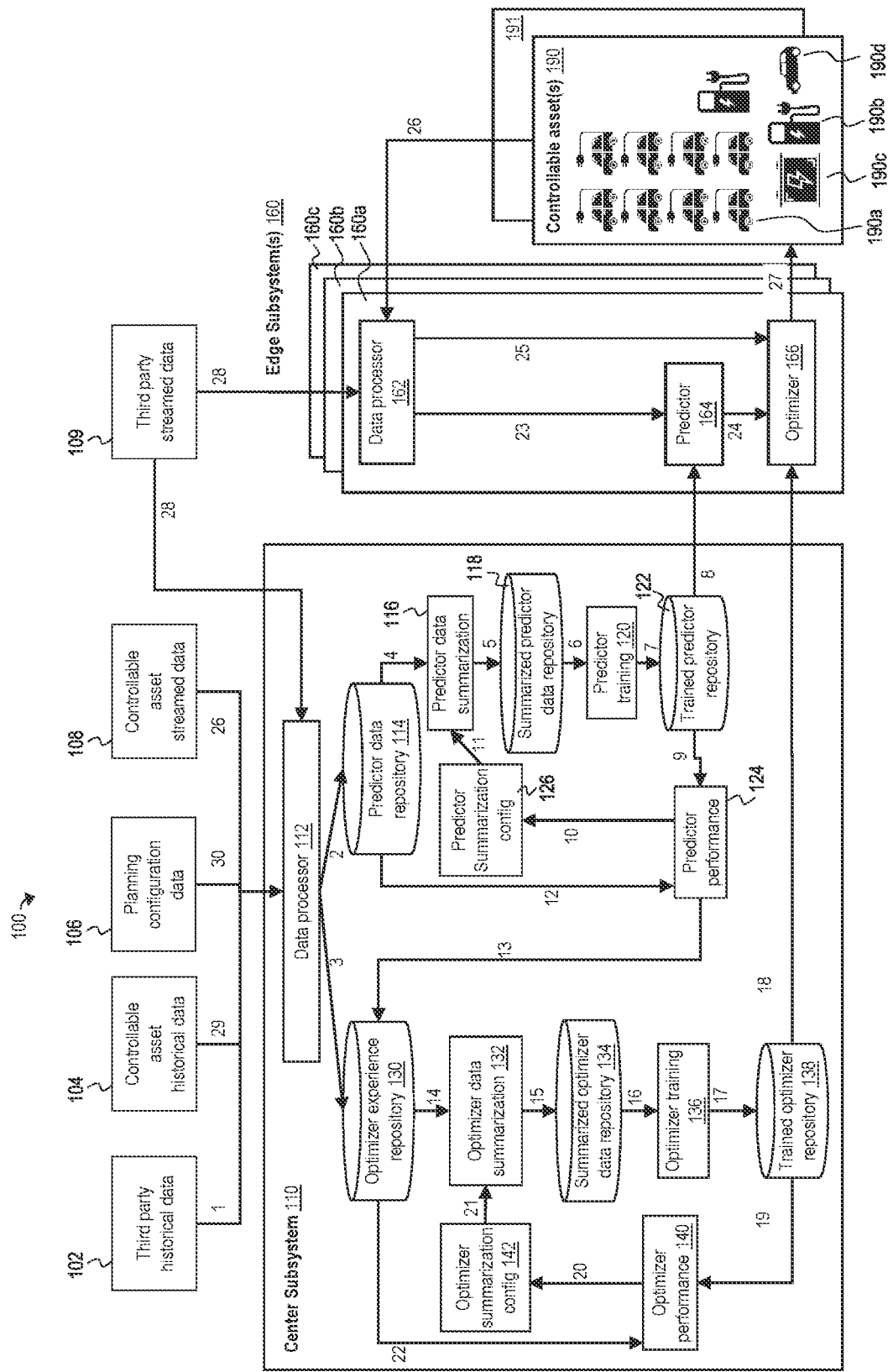
FIG. 1 is a block diagram of an example system for providing control in relation to a group of controllable assets.

The relative sizes and relative positions of elements in the drawings are not necessarily drawn to scale. For example, the shapes of various elements and angles are not necessarily drawn to scale, and some of these elements may be arbitrarily enlarged and/or positioned to improve the readability of the drawings. Further, the particular shapes of the elements as drawn are not necessarily intended to convey any information regarding the actual shape of the particular elements, and have been solely selected for ease of recognition in the drawings.

DETAILED DESCRIPTION

The present disclosure generally relates to improvements in computer-based energy asset management technologies.

An energy asset management system may control a plurality of assets in a system. A system may include or interface with an electric power grid, an energy generation system, a distribution network, system infrastructure, and/or assets in the system. These may be referred to as energy assets, or controllable assets. As a mere example, assets may include electric vehicles (EV) and electrical charging stations (ECS) where the EVs recharge their batteries. Management may relate to controlling these assets, for example by scheduling charging sojourns for EVs, and/or communicating planning information to the assets, or any other types of control, A sojourn generally refers to the period during which an EV is plugged into an ECS. Charging stations put capacity demands on the electrical utility grid to which they are connected. Generally, an optimization goal may be to meet the charging needs of EVs, or more specifically of the EV users, while respecting technical constraints of an energy grid to which the ECSs are connected, such as a maximum energy demand that may be fulfilled at any given point in time. Further, control may extend to general vehicle fleet scheduling, in which case the optimization goal may be, as a mere example, for fleet vehicles to visit all required geographic stops and simultaneously minimize energy costs and not violate technical constraints of the electrical supply arid. In detail, the control of sojourns of a specific EV may be include communicating planning information to an EV regarding a preferred list of ECSs to visit next, control of if and when charging occurs after the EV has connected to a specific ECS, and making available planning information regarding a required minimum SOC to reach before leaving an ECS. Further, a minimum SOC level may be chosen to enable an EV to complete its part of the fleet schedule, for example, to travel as far as the next ECS along a path in general agreement with any geographic stops that may be assigned to the EV as part of fleet scheduling. Further, control may extend to conventional non-electric vehicles or other assets that are controlled as part of system-wide planning iteration. As a mere example, some fossil fuel powered vehicles may be assigned to complete a specific route, and as a result, no EVs are required to complete travel that route, and the ECS charging demand along that route may be somewhat reduced. Again, in some embodiments, control of non-electrical energy assets may be entailed in the control of electrical energy assets.

Existing energy asset management systems suffer from some drawbacks. The following are some mere examples. For instance, the amount time needed to perform a computation, such as an optimization solution or training a predictor, can be too large and results in missing a decision deadline. Missing a deadline includes the possibility of the computation returning a result within the allowed time and that result being of insufficient quality. Further, the computer memory size needed to perform a computation can be too large resulting in a failure to complete the computation or to complete it on time. Further, the data can fill the available data storage or memory of the computing system running the computation. Further, in systems that use machine learning techniques to train an optimizer and/or predictor using training data, the shear size of the training datasets may require huge computer resources to complete the training, which can be a problem if the training cannot be completed in a reasonable amount of time or expense.

Further, prior systems attempt to perform optimizations and/or predictions for controlling assets in the system, such as EVs, without the benefit of certain types of information originating outside of the system (external data) that could otherwise improve the performance of the controlling of the assets. An example type of external data is data relating to traffic conditions. For example, an energy asset management system may use a time profile of local grid power capacity and a power demand based on historic EV charging times in a neighborhood. However, due to traffic congestion or some other factor(s), many EVs arrive to their ECSs later than usual. As a result, the actual timing of the increase in power demand is different from the historical profile. Consequently, optimal planning decisions that had been made anticipating the historical pattern are now sub-optimal, resulting in a degradation in the performance of the energy asset management system.

The present disclosure generally relates a computer-based energy asset management system, which may, among other things, control the system, including a plurality of energy assets in the system, for example EVs, ECSs, charging infrastructure, EV batteries, and/or battery energy storage systems. In particular, according to an aspect, the present disclosure relates to reducing the amount of computing resources, such as time, memory, and/or storage that are needed to perform computations in a computer-based data-driven energy asset management system using a data summarization algorithm. In a sense, reducing the amount of computing resources required may result in an acceleration of the computation, meaning the computation may be performed in less time, thereby potentially resulting in improvements in the performance of the energy asset management system. In an embodiment, an improvement may be in the form of an enhanced ability for the system to provide accurate control of assets in the system in real-time or near-real-time.

In these senses, these aspects according to the present disclosure provide improvements to energy asset management control technologies, and/or improvements to computer technologies for example by improving the functioning of the computer(s) itself, for example by reducing the processing time by the computer(s) to perform computations and other operations, and/or reducing the amount of computing resources of the computer(s) required to perform computations and other operations. A reduction in computing resources may include a reduction in computer processing power, a reduction in computer memory, and/or a reduction in computer storage. Moreover, in some scenarios, it is possible that a specified computation cannot be completed within a specified computing resource. However, by using the teachings according to the present disclosure, a computation may be reduced thereby enabling it to be completed within that computing resource. That is, the present disclosure may increase the scope of possible computations that may considered and used in energy asset management systems. A scope of possible computations, for example optimizations, may entail a number of variables, number of assets, volumes of data, rates of data, and/or other high level measures of computation size.

The term summarization algorithm used herein generally refers to one or more algorithms, methods, processes, configurations, or other techniques for performing data summarization. A summarization algorithm may involve creating or selecting a subset of data from a larger data set where the subset acts as a summary of the larger data set. The subset may be referred to as a summarized dataset. The larger data set may be discarded or ignored while the summarized dataset may be used in a computation, Since the summarized dataset is smaller, the computation may often be performed with fewer computing resources compared to a similar computation performed using the larger data set. Thus, a computation may be performed, for example, more quickly to in turn allow control decisions for assets in the energy asset management system to also be made more quickly. The selecting the subset of data may be done in a strategic and intentional manner, for example as opposed to randomly or arbitrarily, to attempt to reduce a loss in performance of the computation by having taken as input only a subset of the data. In an embodiment, any suitable strategy, technique, and/or algorithm (herein just algorithm for simplicity) for selecting a subset of data may be used. For example, in an embodiment, such an algorithm may be chosen from among a variety of algorithms for selecting a subset of data known to persons skilled in the art. In an embodiment, a strategic choice may be to employ a sub-setting algorithm that has associated performance guarantee(s). An example algorithm is the coreset algorithm and/or the data-sketch algorithm. In an embodiment, a method according to the present disclosure is to respect the mathematical requirements of said guarantees in the design that integrates summarization steps into the overall centre and edge energy asset computation. As a non-limiting example, FIG. 2 relates to an embodiment according to the present disclosure for the application of scheduling EV charging. However, it is to be understood that the teachings according to the present disclosure may be applied in other applications. In an example embodiment, the teachings according to the present disclosure may be used to control a partial or full variety of controllable energy assets, mere examples being EV, ECS, energy storage systems, energy generation systems, etc. Further, the teachings according to the present disclosure may be used may be used to optimize one or more, or a full variety of figures of merit (FOM), mere examples being peak power, power ramp rate, grid congestion, charge scheduling, fleet on-time delivery performance, market revenue, failure risk, etc. In an optimization, an optimization objective may be expressed as a numerical figure of merit (FOM) value, which is to be maximized or minimized. The performance of the optimizer may then be assessed, for example based on a FOM value of the optimizer.

According to an aspect, the present disclosure relates to accelerating computations in a computer-based energy asset management system. According to an aspect, the present disclosure relates to accelerating optimizations in a computer-based energy asset management system. Optimizations may relate to controlling assets in the system such as EVs. Some examples of types of optimizations in a system may relate to scheduling of EV charging and may include maximizing the state of charge (SOC) of EVs at the end of a given time period, minimizing cost of charging electric vehicles, maximizing the charging efficiency of vehicles, increasing the use of certain types of energy such as locally generated renewable energy, etc.

According to an aspect, the present disclosure relates to accelerating predictions in a computer-based energy asset management system. Predictions in an energy asset management system may include predicting any suitable type(s) of parameters or other values for use in relation to controlling the energy assets. Some examples of predictions include predicting charging interactions, which may include for example EV sojourns. Predicting EV sojourns may involve one or more of, for example, arrival time at an ECS, departure time from an ECS, total charging time in a charging session at an ECS, predicting charging energy demand in a given time interval, predicting traffic conditions in a time interval, Some other examples of predictions including predicting an amount of renewable and/or non-renewable energy that may be generated in a given future time interval, predicting future energy demand, predicting an amount of CO2 that may be emitted from various fossil fuel sources, predicting power demand in a given time interval, predicting energy prices in a given time interval for example day ahead energy market prices, time of use energy prices, predicting weather, predicting amounts of sun and/or wind for renewable energy generation, etc, A prediction calculation or process may be accelerated or otherwise improved, for example, by reducing the time required to perform the prediction by one or more computers, and/or by using fewer computing resources, for example processor time and/or computer memory.

The acceleration of computations in the energy asset management system may result in improvements in the functioning and performance of the system, for example in the real-time or near-real-time functioning and performance of the system, Improvements may include control decisions for the system being made more quickly since training of predictors and/or optimizers may be completed more quickly, and/or since control related calculations, for example optimization related calculations and/or prediction related calculations, take less time. Quicker control decisions can mean the decisions are made on fresher data, thereby providing improved control of system, as opposed to making control decisions on older data, which means the control decisions are made based on an older state of the system, thereby reducing the performance of the system. It may be possible that some computations can be performed, as a mere example, two to ten times faster than if the summarization had not be used. Further, an improvement may be in the form of being able to perform a computation(s) under a computational constraint and/or other constraint(s) such as a time deadline. Further, an improvement may be in the form of a grid system having an enhanced ability to control energy demand and thereby operate at a preferred technical state, such as experiencing lower peak loads. Further, an improvement may be in the form of more accurate grid system energy demand predictions.

Furthermore, an improvement of employing summarization in an energy asset management system may be that historical data will have a higher informational value and/or higher objective function value. For example, in the case that a system exceeds a limit on storage, it happens that non-selected data may be fully discarded from the system and the data-summarization function effectively assumes the role of deciding the system data archive. In that case, there may exist a benefit that using data-summarization that has mathematical guarantees results in an archive that best preserves the potential to support optimizations with high FOM.

In an embodiment, a plurality of different summarization algorithms may be performed with the purpose of selecting one of the summarization algorithms that may provide for the best performance of the computation, for example of an optimization or prediction. For example, a plurality of different summarization algorithms may be performed on the data to generate a plurality of different summarized datasets. Different summarization algorithms may refer to, for example, summarization algorithms being configured with different configuration parameter(s), and/or summarization algorithms using different summarization techniques or approaches. An example configuration parameter for an summarization algorithm is summarization level, which may for example represent a desired size of the summarized dataset, or a percentage reduction in the size of the original dataset, or some other parameter relating to a size of the summarized dataset. Each of a plurality of instances of a computation, such as an optimizer and/or predictor, may be trained on a different summarized dataset. In this sense, a predictor or optimizer instance may be a predictor or optimizer that has been trained using a specific summarized dataset, and/or a predictor or optimizer that has been configured in a specific way. For example, a first instance of an optimizer may be trained using a first summarized dataset, and a second instance of the optimizer may be trained using a second summarized dataset, and so on.

In an optimization, the optimization objective may be expressed as a numerical figure of merit (FOM) value, which is to be maximized or minimized. The performance of each instance of the optimizer may then be assessed, for example based on a FOM value of each instance of the optimizer. A computational result, for example from an optimization or prediction, that is obtained by using the summarized data is generally somewhat reduced in quality due to a portion of the data having been ignored due to the summarization. The reduction in quality, or degradation, may be determined or assessed based on a FOM value associated with the computational result. In an embodiment, the FOM values of several optimizer instances may be compared, for example ranked, and one of the optimizer instances may be selected. Further, in an embodiment, a first instance of an optimizer may be trained using a first summarized dataset. The FOM value associated with the first instance of the optimizer may then be assessed to gauge the performance of the first instance of the optimizer, for example the FOM value may be compared to a baseline or threshold value. If the FOM value is determined to be acceptable, then the first instance of the optimizer may be used at edge subsystem 160 for controlling assets 190 in the system. If the FOM value is determined to be not acceptable, then a second instance of an optimizer may be trained using a second summarized dataset. The FOM value associated with the second instance of the optimizer may then be assessed to gauge the performance of the second instance of the optimizer, and so on.

Summarization algorithms may be chosen from among those with performance that is subject to mathematical guarantees, for example a guarantee that a reduction in FOM for an instance of a computation will not exceed a predefined threshold. Summarization algorithms employed may be chosen from among those discernible to be of comparable computational effort as the primary computation, for example an optimization or predictor training, that is performed using the data that is produced by the summarization algorithm, Overall system objective performance may be negatively, yet often modestly, impacted by using summarized data, and the degree of the impact may be known by the guarantees. In other words, in an embodiment, it is possible to control the amount of reduction in performance by the system caused using summarized data so that the performance is kept within an acceptable range. An example guarantee could be that FOM(instance of optimizer A) >½

FOM(Optimal), meaning an instance of an optimizer trained on a summarized dataset will have FOM is greater than 50% of a FOM of the optimizer trained on the full (un-summarized) dataset. It is to be appreciated that values other than 50% may exist in the guarantees of summarization algorithms that may be used in embodiments according to the present disclosure. It is to be appreciated that, in at least some instances, the summarized optimization may be practical to compute, whereas the un-summarized optimization may be impractical to compute.

Further, a sequence of data summaries may be stored over time, and these summaries may be used to diagnose a need to maintain the energy asset management system, or the energy assets. Maintaining the management system may include updating model tuning, for example when there is statistical drift. For example, for the optimizer training aspect and/or the predictor model training aspect, model tuning may include model changes above and beyond training a model of fixed structure, to include model structural changes. In the art, model structure may include aspects of choosing among families of mathematical models, and within a model family, may include specifying numerical values for structure parameters (so called hyper-parameters). In regards to energy assets, there may be a direct benefit to stakeholders to be made aware in the event that energy asset measurements fall outside historical or expected ranges. The statistics of a sequence of data summaries may support the calculation of an expected range of behaviour of energy assets.

According to an aspect, the present disclosure relates to predicting charging interactions relating to EVs based on information external and/or internal to the energy asset management system. In an embodiment, a charging interaction may relate to, or comprise, an EV charging sojourn. A non-limiting example is that a sojourn is an event that begins when an EV electrically connects or couples to an ECS, and ends when the EV disconnects. Further, during a sojourn, the movement of energy may be directed from an ECS toward an EV, or from an EV toward the ECS (so-called "vehicle to grid"), or be zero. Further, predicting sojourns may include predicting information entailed in a sojourn, for example the energy flow described, market energy price information, and/or EV state information at the start and/or during the sojourn. System sojourn information may include information relating to existing sojourns and/or past sojourns at ECSs. Predicting sojourns may involve, for example, one or more of predicting EV time of arrival at an ECS, EV time of departure from an ECS, and/or duration of the sojourn, and/or probability of departure from an ECS in a time window. In an example, an EV time of arrival and/or departure may or may not refer to the times at which the charging begins and ends. For example, an EV may arrive at and connect to an ECS and then wait to begin charging, and/or an EV may end charging but may still be connected to an ECS. This may occur, for instance, in systems with privately owned ECSs (for example a bus depot), or public charging systems that may use energy price incentives to induce customer flexibility regarding charge completion time.

A charging interaction may include an EV sojourn. In addition to aforementioned possible aspects of a sojourn that may include arrival time, departure time, charging time, and/or charging amounts within the sojourn, and/or probabilities of arrival and/or departure in a time window, and so on. A charging interaction may include vehicle state information prior to a sojourn, for example including SOC, battery fault condition, and/or other vehicle diagnostics.

Further, a charging interaction may include a list(s) of ECS, for example toward which the EV may proceed and connect for charging. Further, a charging interaction may include charge planning advice to an EV operator, for example, the expected charge completion time available at listed ECSs. Further, a charging interaction may include market energy price information, and/or information regarding capability of the EV to perform vehicle to grid energy transfer. Further, a charging interaction may include finalization information, for example, the SOC at EV departure, battery health at EV departure, charging costs, and/or information related to the state of completion of the charging sojourn. In an embodiment, probabilities of EVs arrival and/or departure in a time window may relate to a set of all such probabilities for all pairs (EV, ECS) that represents a model of the mobility of all the EVs. Such a model of EV mobility may provide for a mechanism by which traffic forecasts may be used to potentially improve a computation, such as an optimization.

According to an aspect, the present disclosure relates to predicting and controlling system EV power demand, based on, but not necessarily solely on, information external to the energy asset management system. System EV power demand is a broad term that may refer to the collective individual and/or total energy consumption of EVs in a time period. For example, system EV power demand may increase during cold weather, for example, due to the use of EV cabin heating. Further system EV power demand may include the collective individual and/or total power flows between ECS and EVs in a time window. For example, on a power grid with substations, the present disclosure may relate to predicting the total power flowing through the substation to ECSs that are connected to the substation using internal and said external information. The external information may comprise, for example, road traffic information. Road congestion may change the arrival time of one or more EVs to ECSs in a way that has measurable impact on the power grid. The predicting may involve the use of techniques for accelerating computations according to the present disclosure. Further, the predicting may use or be based on a data-driven approach. Further, the predicting may involve time-series forecasting.

According to an aspect, the present disclosure relates to methods and systems that use weather historical and/or forecast information as external data to forecast and control energy assets. For example, daily climate or weather may have an impact on the way people use energy assets including EVs. Further, there may be a correlation implicit or explicit between climate or temperature and energy consumption volumes and prices. In general, energy asset management may consider energy volumes and prices in a system FOM that may also be sensitive to system performance criteria that may relate to delivering an economic good. Example economic goods may include, for example, that a bus must deliver passengers, a courier must deliver packages, each private EV user receives personal transportation etc. Further, to the extent that the impact of such phenomena on energy assets may be forecasted, and there may exist flexibility to choose among control actions, there is a potential benefit to increase system FOM by incorporating forecasts in a control strategy according to teachings of the present disclosure. As mere examples, cold weather may increase individual EV power consumption by cabin heating and battery heating, and warm weather may increase individual EV power consumption by cabin air conditioning, and by reduced EV battery efficiency. An energy asset management system according the present disclosure may use weather forecast information to determine, perhaps implicitly, that EVs may arrive to ECSs with relatively diminished SOC as compared to during moderate conditions. Further, a scheduler for use in scheduling various actions and so on of the assets may have flexibility to extend charging duration to achieve higher SOC at sojourn end to meet the incremental power demand due to weather correlations. Further, an optimization across multiple EVs may have flexibility to allocate the associated increased charging times in a most efficient way regarding FOM across a time window and across assets. In another example embodiment, busses may be scheduled and external weather forecast includes rain. In general, rain increases bus passenger count, which in turn increases bus weight, which in turn increases bus energy consumption. Further, extreme weather hot or cold may have an effect on energy prices. The present disclosure relates to a control system that optimizes the charging costs of an electric bus fleet by for example using weather information to adjusting bus routes to meet service delivery requirements and indicating which ECS each bus should use to charge and when, for example with a target arrival and departure time windows at a specific ECS. The foregoing are mere examples of how an energy asset management system may use weather information in relation to controlling assets in the system, which may include optimizing a system FOM. Further, a predictor may report a maximum travel distance related to each EV SOC and such information may be made available to a geographic routing function of a scheduler.

According to an aspect, the present disclosure relates to controlling EV charging power demand via scheduling, which may, for example, determine when and/or how and/or where EVs are charged. For an individual EV, control may include receiving a list of preferred ECSs, and/or when an EV is connected to an ECS, control may include letting a controller or optimizer of the system decide when to begin and or at what SOC level to end charging of EV. The scheduling may be designed to balance the demands of EV users with the capacity constraints of a power grid to which ECSs are attached. The controlling EV charging power demand via scheduling may be based on predictions of charging interactions, such as EV charger sojourns, and/or predictions of EV charging power demand. The scheduling, which may address the task of system wide scheduling of EV charging rates, may be useful for electrical utilities to use as part of a demand response (DR) system. Further, an energy optimization may be part of a larger scheduling function in the system, for example scheduling the routes and/or stop times of a fleet of EV busses, or planning the routes of a fleet of electric package delivery vehicles. In an embodiment, fleet scheduling may control both electric vehicles and vehicles that use other fuels.

In an embodiment, an energy asset management system may be part of, or otherwise interface with, an electric utility that supports multiple ECSs and multiple EVs.

Other non-limiting examples of controllable assets include batteries, battery energy storage systems (BESS), ECSs, electrical substations, wind turbines, fossil fuel power generation plants, and heating, ventilation, air conditioning (HVAC) devices or systems.

EVs may be any type or types of vehicles. They may include trucks, cars, buses, motorcycles, trains, boats, ships, other watercraft, airplanes, helicopters, other aircraft, and space craft. The vehicles may be manually operated vehicles and/or autonomous vehicles.

In an embodiment, to support scalability, in that controllable assets are numerous and geographically dispersed, a system according to the present disclosure may have a hierarchical structure, for example a center-edge architecture. In this regard, in an embodiment, the system may have a center subsystem and one or more edge subsystems. Some functions and features may be performed at the center subsystem while other functions and features may be performed at the edge subsystem(s).

According to an aspect, the present disclosure is directed to a method comprising at one or more electronic devices each having one or more processors and memory storing, in a database, data associated with a computer-based energy asset management system, wherein the energy asset management system is adapted for providing control in relation to a plurality controllable assets, performing data summarization on an original dataset comprising data from the database to generate a summarized dataset, wherein the size of the summarized dataset is smaller than the size of the original dataset, wherein each of at least some records in the summarized dataset represents a plurality of records in the original dataset, training a computation model using data from the summarized dataset, and providing control in relation to the plurality of controllable assets using the trained computation model.

In an embodiment, the method further comprises performing data summarization multiple times with different summarization algorithms to generate multiple summarized datasets, training each of a multiple of instances of the computation model with a different one of the multiple summarized datasets, assessing the multiple trained instances of the computation model, and selecting at least one of the trained instances of the computation model based on the assessing, wherein the trained computation model for the providing control in relation to the plurality of controllable assets is the selected trained instance of the computation model.

In an embodiment, the computation model comprises a predictor, wherein the training involves training the predictor using data from the summarized dataset, and wherein the providing control involves using predictions generated by the trained predictor.

In an embodiment, the controllable assets include electric vehicles (EVs), and the method further comprises generating predictions relating to charging interactions of EVs, wherein the providing control is based on the predictions relating to charging interactions of EVs.

In an embodiment, the generating predictions relating to charging interactions of EVs is based on road traffic information.

In an embodiment, the generating predictions relating to charging interactions of EVs is based on weather related information.

In an embodiment, the computation model comprises an optimizer, wherein the training involves training the optimizer using data from the summarized dataset, and wherein the providing control involves using the trained optimizer, wherein the controllable assets include electric vehicles (EVs), and wherein the providing control using the trained optimizer involves scheduling of charging interactions for EVs.

According to an aspect, the present disclosure is directed to a system, comprising one or more processors, and memory storing instructions for execution by the one or more processors, the instructions for operations comprising storing, in a database, data associated with a computer-based energy asset management system, wherein the energy asset management system is adapted for providing control in relation to a plurality controllable assets, performing data summarization on an original dataset comprising data from the database to generate a summarized dataset, wherein the size of the summarized dataset is smaller than the size of the original dataset, wherein each of at least some records in the summarized dataset represents a plurality of records in the original dataset, training a computation model using data from the summarized dataset, and providing control in relation to the plurality of controllable assets using the trained computation model.

In an embodiment, the instructions for operations further comprise performing data summarization multiple times with different summarization algorithms to generate multiple summarized datasets, training each of a multiple of instances of the computation model with a different one of the multiple summarized datasets, assessing the multiple trained instances of the computation model, and selecting at least one of the trained instances of the computation model based on the assessing, wherein the trained computation model for the providing control in relation to the plurality of controllable assets is the selected trained instance of the computation model.

In an embodiment, the computation model comprises a predictor, wherein the training involves training the predictor using data from the summarized dataset, and wherein the providing control involves using predictions generated by the trained predictor.

In an embodiment, the controllable assets include electric vehicles (EVs), and the method further comprises generating predictions relating to charging interactions of EVs, wherein the providing control is based on the predictions relating to charging interactions of EVs.

In an embodiment, the generating predictions relating to charging interactions of EVs is based on at least one of road traffic information and weather related information.

In an embodiment, the computation model comprises an optimizer, wherein the training involves training the optimizer using data from the summarized dataset, and wherein the providing control involves using the trained optimizer, wherein the controllable assets include electric vehicles (EVs), and wherein the providing control using the trained optimizer involves scheduling of charging interactions for EVs.

According to an aspect, the present disclosure is directed to a non-transitory computer-readable medium having computer-readable instructions stored thereon, the computer-readable instructions executable by at least one processor to cause the performance of operations comprising storing, in a database, data associated with a computer-based energy asset management system, wherein the energy asset management system is adapted for providing control in relation to a plurality controllable assets, performing data summarization on an original dataset comprising data from the database to generate a summarized dataset, wherein the size of the summarized dataset is smaller than the size of the original dataset, wherein each of at least some records in the summarized dataset represents a plurality of records in the original dataset, training a computation model using data from the summarized dataset, and providing control in relation to the plurality of controllable assets using the trained computation model.

In an embodiment, the computer-readable instructions for operations further comprise performing data summarization multiple times with different summarization algorithms to generate multiple summarized datasets, training each of a multiple of instances of the computation model with a different one of the multiple summarized datasets, assessing the multiple trained instances of the computation model, and selecting at least one of the trained instances of the computation model based on the assessing, wherein the trained computation model for the providing control in relation to the plurality of controllable assets is the selected trained instance of the computation model.

In an embodiment, the computation model comprises a predictor, wherein the training involves training the predictor using data from the summarized dataset, and wherein the providing control involves using predictions generated by the trained predictor.

In an embodiment, the controllable assets include electric vehicles (EVs), and the method further comprises generating predictions relating to charging interactions of EVs, wherein the providing control is based on the predictions relating to charging interactions of EVs.

In an embodiment, the generating predictions relating to charging interactions of EVs is based on road traffic information.

In an embodiment, the generating predictions relating to charging interactions of EVs is based on weather related information.

In an embodiment, the computation model comprises an optimizer, wherein the training involves training the optimizer using data from the summarized dataset, and wherein the providing control involves using the trained optimizer, wherein the controllable assets include electric vehicles (EVs), and wherein the providing control using the trained optimizer involves scheduling of charging interactions for EVs.

For descriptive purposes, several aspects, embodiments, and features according to the present disclosure are described in relation to energy asset management systems associated with EVs. However, this is not intended to be limiting. The teachings according to the present disclosure may be applied to fields and technologies other than energy asset management system and/or EVs, including but not limited to other types of assets including assets in an energy system.

FIG. 1 is a block diagram of a non-limiting example system 100 for providing control in relation to a group of controllable asset(s) 190 according to the present disclosure. FIG. 1 shows example controllable assets 190 as including one or more of EVs 190a, ECSs 190b, and batteries 190c, and non-electric controllable assets 190d. Controllable assets may alternatively be referred to as energy assets. In the following description of this example embodiment, the controllable assets 190 include a plurality of electric vehicles(EVs). However, in general terms, the controllable assets may include any other type or types of controllable asset(s). Thus, the description herein of EVs as controllable assets is non-limiting. Non-limiting examples of other assets include charging infrastructure, ECSs, EV batteries, battery energy storage systems, and/or building management systems, to name but a few.

In this example embodiment of FIG. 1, system 100 is shown as comprising center subsystem 110 and edge subsystem 160, which may cooperate to provide control in relation to EVs 190. Center subsystem 110 may be tasked with performing operations such as data summarization, training one or more computational models for performing a computation, such as for example predictors and/or optimizers, for use in controlling EVs 190, and/or processing, cleaning, and/or storing data. Edge subsystem 160 may be tasked with, among other things, using the one or more predictors and/or optimizers for controlling EVs 190.

It is to be appreciated, however, that in other embodiments, system 100 may not be subdivided into center subsystem 110 and edge subsystem 160 as herein shown and described, or subdivided at all. In other words, the subdivision into center subsystem 110 and edge subsystem 160 is in no way meant to be limiting.

FIG. 2 is a diagram of an example system 200 comprising an electric utility 202 with a distribution network, one or more electrical substations 204, and one or more electric charging stations 206. Several electric vehicles 208 are also shown. A non-electric vehicle is shown 209. A system, such as system 100, may be provided to provide control in relation to controllable assets such as electric charging stations 206 and/or electric vehicles 208, and/or non-electric vehicles 209. In an example embodiment, a center subsystem 210 may be communicatively coupled to one or more edge subsystems 260, which may in turn be communicatively coupled to one or more controllable assets, for example electric vehicles 208, electric charging stations 206, and/or non-electric vehicles 209. However, it is to be appreciated that in other embodiments, different arrangements and/or configurations of center and edge subsystems 210, 260 may be used. Moreover, it is to be appreciated that entities in FIG. 2 may communication with one another even though there are no lines shown interconnecting those entities in the figure.

Referring again to FIG. 1, in an embodiment, the controlling of EVs 190 may comprise solving an optimization problem, for example attempting to maximize or minimize at least one objective function relating to the control of EVs 190. In this regard, system 100 may comprise one or more optimizers or controllers for making any type(s) of suitable optimizations and/or other control decisions. In an embodiment, system 100 comprises an optimizer for scheduling the charging of EVs in the system. Scheduling may involve, for example, one or more of scheduling the start and/or end of charging sojourns for EVs, the ECSs at which the charging occurs, and/or the charge rate of the EVs. Scheduling may use any suitable techniques or algorithms.

Other non-limiting examples of possible optimizations may include or be related to one or more of electric energy consumption of vehicles, other fuel consumption of vehicles, energy storage device charging, and/or electric charging related parameters of electric assets, such as EVs. Optimizing the charging of electric assets may relate to one or more of, for example, minimizing charging cost, maximizing charging efficiency, increasing use of certain types of energy such as locally generated renewable energy, etc.

Furthermore, system 100 may comprise one or more predictors for predicting or estimating any suitable type(s) of parameters or other values, which may be used in relation to controlling the EVs 190. A predictor may be or comprise a function that returns a label based input information. In the field of machine learning, a sample may be in the format of (feature, label), where features are measurable properties or descriptive attributes of a phenomenon being observed, and labels are what is being predicted or forecasted by the machine learning system. Label information may be used by a controller of system 100, which may include an optimizer(s), for making control decisions and/or optimizations. For instance, label information may be used as input to an optimizer. The input information may comprise a feature value and a configuration parameter or information w, where configuration w may include a mathematical structure and numerical parameters of predictor.

An optimizer and/or predictor may be implemented in software, in hardware, or in a combination of both software and hardware.

In an embodiment, system 100 comprises a predictor for predicting charging interactions, such as EV charging sojourns, and/or a predictor for predicting EV charging demand, for example total power required to charge EVs in system 100, or some subset(s) of EVs in system 100, in a given time period. Further, one or more predicted values or parameters may be used as input to an optimizer for controlling EVs 190.

Other non-limiting examples of predictions may include one or more of predicting EV sojourns, for example predicting times of arrival or sojourn durations of EVs at ECSs, predicting traffic conditions for example traffic weight or congestion, predicting an amount of renewable and/or non-renewable energy that may be generated in a given future time interval, predicting future energy demand, predicting an amount of $CO_2$ that may be emitted from various fossil fuel sources, if they are dispatched in a given time interval, predicting power demand in a given time interval, predicting energy prices in a given time interval for example day ahead energy market prices, time of use energy prices, primary reserve market energy prices, auxiliary reserve market energy prices, renewable energy prices, local renewable energy prices, or any combination thereof, predicting weather, predicting amounts of sun and/or wind for renewable energy generation, etc.

Once an optimizer and/or predictor have been trained at central subsystem 110, they may be communicated to, or otherwise made available to, edge subsystem 160 for use in controlling the EVs 190, In an embodiment, rather than sending an entire predictor or optimizer, configurations parameters for the predictor or optimizer may be sent. In this regard, edge subsystem 160 may comprise one or more of predictor 164, optimizer 166, and data processor 162, Optimizer 166 may base its computations and/or control actions on various information, such as current control environment information, for example EV related streamed data 108, as represented by signal 26. Further, the information may include third party streamed data 109, as represented by signal 28.

In an embodiment, system 100 may comprise several edge modules 160a, 160b, 160c and each edge module may be associated with its own controllable assets group 190, 191. Controllable asset streamed data, represented by signal 26, may be associated at data processor module 112 with an identity of a specific edge module that carried the data, for example, and with reference to FIG. 1, edge module 160a or 160b or 160c, Edge identity information may be used in center module 110 to train optimizers and/or predictors using FOMs that may be distinct to each edge module, and the center FOM may be a mathematical combination of edge FOMs. It is to be appreciated that controllable assets 190 and edge modules 160 connected to a center subsystem 110 may be distinct in nature, for example one may be an EV fleet, one might be an airport, one might be gas-fired electric generating plant in the same city. In this example, one of edge modules 160a, 160b, 160c may be associated with an EV fleet, and one of the controllable asset groups 190, 191 may comprise EVs of the fleet. The center and edge architecture may allow the needs implicit in edge FOMs to be met while the center FOM implicitly finds operating points that achieve compromise where competing objectives may exist. As another mere example of heterogenous controllable assets, each edge instance may be the controller of one part of a virtual power plant.

However, in other embodiments where system 100 is not subdivided into a central subsystem 110 and edge subsystem 160, trained optimizer repository 138 and/or trained predictor repository 122 need not necessarily be communicated to, or otherwise made available to, another subsystem.

In general, center subsystem 110 may perform one or more of the following functions. Summarization may be performed on data that will be used to train a predictor and the trained predictor itself may be stored in trained predictor repository 122. The summarized dataset may be used to train the predictor, and the predictor may be provided to the edge subsystem 160. Similarly, summarization may be performed on data that will be used to train an optimizer. The summarized dataset may be used to train the optimizer, and the optimizer itself may be stored, and the optimizer may be provided to the edge subsystem 160. The predictor and/or optimizer at edge subsystem 160 may be used to control EVs 190.

Further, in the example embodiment of FIG. 1, one or more datasets such as the following may be used, for example Exogenous data from third parties such as third party historical data 102 and/or third party streaming data 109; controllable asset historical data 104 and/or streamed data 108 including Sojourning, SOC, and Charge; and Grouping, and Planning 106. Exogenous data may refer to data from outside the electric utility, for example traffic conditions, road congestion status, traffic predictions, forecast, current weather, historical weather information, weather forecast information, day-type (for example working, school day, holiday), events across different areas of the city (for example a new year celebration), city demographic (for example residential area, central train stations where people park and ride), and/or any other suitable types of information.

In an embodiment, the teachings according to the present disclosure may make possible a practical formulation of an energy asset management computation, such as an optimization, that may otherwise would not be practical to implement. Further, in at least some embodiments, the benefit existing in large external data sources may be used to increase the performance of the system, for example by increasing an FOM of the system. In the example embodiment according to FIG. 1., system 100 may receive third party historical data 102 and third party streamed data 109 carried in signal 1 and signal 28, respectively, that may also be called Exogenous data. The volume of this data received by system 100, which may have a potential to increase performance of a data driven controller, may be immense. As a mere example, in one embodiment later described, Exogenous data includes traffic related data of a city, and uses this data to schedule EV charging. Such traffic measurements often have a larger data volume than a digital photograph. Typically, a huge amount of computational resources could be required to solve an optimization using this immense amount of data, and as a result, the optimization may not be technically feasible.

Sojourning data may include the arrival and/or departure behavior of EVs to ECSs. This may include, for all possible EV and ECS pairings, the fact or probability that the EV is charging via the ECS. An EV may charge from any single ECS, or from none, An EV that is connected or coupled to an ECS may or may not be charging. SOC is the state of charge of the battery in every EV. Increased SOC may be an economic good experienced by ECS users, and therefore may be naturally a component of system-wide objectives. Charge is the instantaneous power flow between any EV/ECS pair. A charge rate may be the subject of prediction and/or subject to control, for example by the electric utility.

A Grouping dataset may include information relating to how ECSs may be grouped together. For example, a variety of system constraints on ECSs may be naturally associated to groups of ECSs, and Grouping dataset may provide an expression for that grouping. For example, it may be natural to consider as a group all ECSs that share a common substation. A Planning dataset may include a comprehensive quantitative expression of the goals of the utility in controlling the impact of the EV charging. For example, if there is a technical constraint to the total power that the utility can deliver to a neighborhood, it could be included in Planning dataset. Information in the Planning dataset may relate to constraints or planning goals that apply to groups of EVs and/or ECSs.

A more detailed description of center subsystem 110 in the embodiment of FIG. 1 is now provided. Center subsystem 110 may comprise various components, features, and/or modules relating to the training of an optimizer and/or relating to the training of a predictor, and/or performing an assessment of several trained predictors and/or optimizers and selecting at least one for use at edge subsystem 160.

Regarding the training of an optimizer, center subsystem 110 may comprise, for example, one or more of an optimizer experience repository 130, optimizer data summarization module 132, summarized optimizer data repository 134, optimizer training module 136, trained optimizer repository 138, which may be referred to as a summarized optimizer repository since it may be trained on summarized training data, optimizer performance module 140, and optimizer summarization configuration module 142.

Regarding the training of a predictor, center subsystem 110 may comprise, for example, one or more of an center subsystem 110 may comprise, among others, one or more of predictor data repository or database 114, prediction data summarization module 116, summarized predictor data repository or database 118, predictor training module 120, trained predictor repository 122, which may be referred to as a summarized predictor repository since it may be trained on summarized training data, predictor performance module 124, and predictor summarization configuration module 126.

Further, center subsystem 110 may comprise a data processor module 112. Center subsystem 110, may receive various types of data and other information, for example one or more of third party historical data 102, such as for example historical time-series data and/or previously operated controllable assets including EVs. This is represented by signal 1. Other example types of data include exogenous data, which may refer to data originating externally from the electric utility, for instance road traffic history, electricity grid congestion history, history of weather forecasts and/or actual historical weather information, day-type, geo-specific cultural events, city demographic, public infrastructure types locations and schedules, and/or geographic information relating to routes between ECSs.

Traffic related information may be generally referred to as road traffic information, and may comprise current and/or recent traffic conditions, historical traffic information, and/or traffic predictions or forecasts. Traffic information may include but is not limited to traffic congestion information, which may affect the mobility of EVs and thus may affect sojourns of EVs. For instance, high traffic may result in EVs reaching their destinations later than could otherwise be expected, while low traffic may result in EVs reaching their destinations at expected times. Further, traffic information may include any of lane closures, road closures, construction, toll stations, vehicle accident information, or any other suitable type of traffic information. Again, some types of this information may affect the mobility of EVs on roads, which may in turn have effects on the grid such as sojourns (e.g. time of arrival, departure).

Weather related information may be generally referred to as weather information, and may comprise current and/or recent weather conditions, historical weather information, and/or weather forecasts. For example, weather conditions may affect the mobility of EVs and thus may affect the electrical grid, for instance EV sojourns if EVs are delayed in arriving at their destinations. For example, traffic may travel at a slower average speed during winter months in climates that get snow or freezing rain. This may be represented in one or more of historical weather, current weather, and weather forecasts. Other types of weather that may be indicated in weather information may include fog, wind, light levels, precipitation, low temperatures, high temperatures, etc. Weather conditions may affect the arrival times of vehicles. Weather forecasts and/or historical weather data may affect the number of EVs on the road, for instance fewer EVs on the road could be expected during a snow storm.

Further, the received information may include controllable asset historical data 104, such as attributes and/or other historic information associated with controllable assets. This is represented by signal 29. Other example types of data include historical transactions, for example vehicle ID, charger ID, start state of charge (SOC), stop SOC, arrive time, depart time, start charge time, end charge time. Further, other example types of data include static attributes of controllable assets, for example EV battery type, and ECS grouping by feeder.

Further, the received information may include planning configuration data 106, for example which may include information relating to goals of the power utility in controlling the impact of the EV charging. This is represented by signal 30. For example, if there was a technical constraint to the total power that the utility can deliver to a neighborhood, this constraint could be included in planning configuration data 106. A variety of system constraints on ECSs may be naturally associated to groups of ECSs. For example, it is possible to consider as a group all charging stations that share a common substation.

Further, the received information may include controllable asset streamed data 108, as represented by signal 26. This data may include, for example, information relating to the status of EVs 190. Further, the data may comprise measurements of EVs updated each step k, for example charging transaction information such as vehicle ID, charger ID, start SOC, stop SOC, arrive time, depart time, start charge time, end charge time, charge duration, and so on. Further, other example types of data include dynamic attributes of assets, for example fault conditions.

Further, the received information may include third party streamed data 109, as represented by signal 28. This data may include, for example, streaming updates of exogenous data, such as road traffic, grid congestion, weather forecast information, actual weather information, day-type, cultural events, infrastructure schedules for example for dams, bridges, or trains. Further, this data may include, for example, configuration change, schedule change, and fault information relating to electrical distribution infrastructure and to transportation infrastructure.

Although the various types of information are described as being received at center subsystem 110, in another embodiment, some or all of these types of information may alternatively or additionally be received at edge subsystem 160.

Data processor module 112 may perform general processing functions, as well as data cleaning, data conditioning, data warehousing, data aggregation, and/or other operations on some or all of the received data. Inputs to data processor module 112 may enable constructing a full but possibly imperfect history for time 1 . . . k of one or more datasets, for example Sojourning, Charge, SOC, Exogenous, Grouping and Planning. Data processor module 112 may transform the historic data into a format more suitable for machine learning techniques, such as supervised learning of time series, and/or a format suitable for reinforcement learning of a policy for an optimization, for example for EV charging decisions.

Data and other information at center subsystem 110 may be stored in one or more repository databases, for example optimizer experience repository 130 and/or predictor data repository 114. A data repository may comprise one or more databases stored on one or more computing devices. The stored data may include, for example, one or more of third party historical data 102, controllable asset historical data 104, planning configuration data 106, controllable asset streamed data 108, third party streamed data 109.

Further, data for potential use in relation to predictions may be stored in predictor data repository 114, which may store various forms of data, including but not limited to streaming and historical data from EIIs and third party sources, some of which may have been pre-processed by data processor 112, as represented by signal 2. At least some of the stored data may be expressed as an up-to-date prediction learning set comprised of n samples like (feature, label).

Data such as one or more of data 102, 104, 106, 108, 109, or equivalently Sojourning, Charge, Grouping, Planning, Exogenous and/or SOC, may be organized in a time-series format, for example with an integer time index k, and further, may be organized to facilitate time-series predictions. Organizing a time-series prediction for a specific purpose may involve designating some data sources as features and some as labels. At least some of the stored data may be represented as full history feature [1 . . . k], label [1 . . . k]. Label[k] may encompass {Sojourning[k], Charge[k], Grouping[k], Planning[k] }. Feature [k] may encompass {k, Sojourning[k–D . . . k–1], SOC[k–D . . . k–1], Charge [k–D . . . k–1], Exogenous [k–D . . . k–1], Grouping [k–D . . . k–1], Planning [k–D . . . k–1] }. D may be a maximum number of timesteps to involve.

Data processor 112 may format or organize data received at center subsystem 110 into suitable or desired formats, such as those described above. In an embodiment, data processor 112 may format at least some data into a format of (feature, label).

A potential characteristic of a dataset stored in predictor data repository 114 and/or optimizer experience repository database 130 in an energy asset management system is that the size of the feature sets as well as the data set size itself may hinder the speed of the training of the predictors and/or optimizers, and/or may make their real-time utilization infeasible in scenarios where a predictor/optimizer needs or desires real-time or near real-time training, and/or when the available computing resources are not sufficient.

Predictor data summarization module 116 may receive data from predictor data repository 114, as represented via signal 4, and may perform a data summarization algorithm on the data. For example, in an embodiment, the received dataset may be of size n and predictor data summarization module 116 may output a summarized or reduced dataset of size m, where m<n. The summarized dataset may be in form of (feature, label, weight) where the "weight" may be associated with the number of data points in the received dataset that a selected datapoint is summarizing. Machine learning algorithms such those that may be used in predictors and optimizers may include a mathematical operation that accumulates a function applied to individual data points. Some such algorithms may be adapted to use summarized data by replacing that accumulation with the function applied to single datum and scaling the result according to the weight. As a non-limiting example with reference to FIG. 3, where a non-summarized accumulation of a function f(feature, label) on signal 4 would encounter the quantity f(3, 7)+f(3.2,7.1), a summarized accumulation could employ a formula weight×f(feature, label), in this case 2×f(3,7).

Further, predictor data summarization module 116 may receive configuration information for configuring the summarization algorithm, for example from summarization configuration module 126, as represented by signal 11. Configuration information may include, for example, the specification of a summarization algorithm, a desired output dataset size m, or a time limit allowed to compute the summarization. As an example, the specification of a summarization algorithm may be a coreset algorithm, a data sketch algorithm, or any other suitable technique(s), and such specification may entail any further configurations specific to the algorithm, for example configurations that define mathematical distances between arbitrarily chosen data pairs (feature1, label1) and (feature2, label2), here called inter-data distance. Further, the entailed configurations may include threshold distances that may be compared to inter-data distances, Where present, the m parameter may be referred to as a summarization level since the original dataset is reduced via summarization to a summarized dataset having m records. Further, summarization configuration module 126 may support evaluating various summarization algorithms, and/or evaluating the performance of one or more predictors that have been trained on summarized datasets that were generated using particular summarization algorithms. Evaluating the performance of several predictor instances, where a predictor instance may be a predictor trained using a specific summarized dataset, may be used to select a predictor instance having the best performance for deployment and use at edge subsystem 160. A predictor instance selected for deployment may made available to edge subsystem 160, as represented by signal 8. In an embodiment, various predictor instances may be predictors trained each using a different summarized dataset that was generated at a different summarization level m. It is to be appreciated that what is considered best may differ depending on the particular implementation or application. Mere examples of best performance are lowest degradation of accuracy of a predictor compared to when summarization is not used, and/or greatest reduction of computing resources compared to when summarization is not used and/or quickest execution time for the predictor. As previously described, a best trained predictor may have to meet a minimum predefined statistical guarantee in order to be eligible for selection and use at edge subsystem 160. In other words, in an embodiment, if a trained predictor does not meet a minimum predefined statistical guarantee, then that predictor will not be used at edge subsystem 160.

FIG. 3 is a table providing an example demonstrating a general concept of summarization in an energy asset management system according to the present disclosure. As noted above, predictor data summarization module 116 may receive data from predictor data repository 114, as represented via signal 4. In the example, the received data has n samples where n=4, and the samples consist of: (3, 7) (3, 2, 7.1) (4, 5) (9, 5). Each sample comprises (feature, label), where, as previously described, features are measurable properties or descriptive attributes of a phenomenon being observed, and labels are what is being predicted or forecasted. A machine learning algorithm tries to learn which patterns in the data lead to the labels. This type of summarization that proceeds by choosing samples is sometimes referred to as row-selection, and is distinct from methods that shrink each individual sample, either by column-weighting, or column-selection.

Configuration information provided by summarization configuration module 126 may include the parameter m, which indicates the desired summary size, meaning the number of samples that are desired in the summarized dataset. In this example, m=3, which is lower than n, which has the value 4, Accordingly, the summarization algorithm is configured to select or create a smaller subset of the received data having 3 samples. The summarization algorithm selects sample (3, 7) as an exemplar for samples (3, 7) and (3.2, 7.1) since these samples are similar to one another. A concept of similarity, that may also be called inter-data distance, may also give rise to an associated summarization algorithm. Further, a coreset algorithm is an example of an algorithm that conforms to the example of FIG. 3, and is not fully specified in that example. In an embodiment, algorithms of the general form shown in FIG. 3 may be used, which may also have associated performance guarantees that may arise in the choice of inter-data distance and in the specification of other configurations. Note that each datum (feature, label) may be considered as a row, that may contain multiple numerical elements (columns). A feature and label may each contain multiple elements. Further, in an embodiment, it is possible to choose, from among available data features, the ones to include as elements of (feature, label) in consideration of respecting said mathematical guarantees, and may be also in consideration of sensitivity of FOM to the feature, and may also be in chosen in consideration of the underlying optimization algorithm. Example considerations may relate to limits on inter-data distance, and may relate to limits the sensitivity of FOM to features. A new field "weight" is added to each sample, namely (feature, label, weight), where weight indicates the number of data points in the received dataset that an exemplar sample is summarizing. In the example, the summarized dataset is as follows: (3, 7, 2) (4, 5, 1) (9, 5, 1). The weight of 2 in (3, 7, 2) indicates that this sample summarizes two samples in the full dataset. The weights of the other two samples (4, 5, 1) and (9, 5, 1) are set to 1 since they both only represent a single sample. The summarization algorithm has therefore generated a summarized dataset having 3 samples from a larger dataset having 4 samples. FIG. 3 shows the initial and final condition of a row-selection summarization. It is to be appreciated that measuring similarity between rows is, in at least an embodiment, is part of the summarization by row-selection, which is not shown in FIG. 3. In an embodiment, it is possible to use a summarization algorithm(s) having appropriate performance guarantees, and such algorithms usually include row-similarity definitions.

As noted above, the data summarization algorithm(s) may be or include any suitable algorithm(s). Some non-limiting and non-exhaustive example data summarization algorithms or techniques that may be used include coresets, data sketches, and/or compressed predictors.

In situations where machine learning is applied to optimal control of dynamic systems, such as an energy asset management system, data-driven approaches may include data-driven robust optimization (DRO) and reinforcement learning (RL). RL has the aspect of experience replay that involves choosing a data subset. Further, sketching may be used to increase the number of dynamic elements that can be tracked by a Kalman Filter. In an embodiment, coreset summarization may be used in reinforcement learning (RL) optimization steps, in the context of experiences that may contain EV data.

A non-limiting example relating to data summarization in an EV charging context with predictions is now described. The example includes possible types and nature of datasets that may be used to predict times of arrival of EVs at various ECSs for example in a city.

For a predictor, the label(s) and the feature set(s) may be developed, for example, from the characteristics of one or more the datasets Exogenous, Sojourning, SOC, Charge, Grouping, and Planning. System loads due to EV charging may be predicted in a formulation that has labels derived from Sojourning and Charge datasets, and features derived from some or all datasets, such as Sojourning, Charge, SOC, Grouping, Planning, and Exogenous.

In the example, an Exogenous dataset may include road congestion information. Road congestion may impact the arrival time of EVs to ECSs, and as such can appear as a forecastable statistical correlation between Sojourning and Exogenous datasets. In one example situation, EVs may be assumed to be charging all the time when connected to ECS, then Charge dataset is known from Sojourning and SOC. An example choice of Grouping has ECSs grouped by utility substation. With Charge and Grouping information, a total ECS charging amount may be calculated for each substation. In this way, the utility operator may predict the impact of road congestion on substation load.

As previously described, according to the present disclosure, it may be possible to process large amounts of data for computations under a computational constraint, such as time deadline. In the present example, regarding the deadline, to gain benefit of the aforementioned prediction of Exogenous impacts to substation loads, there may be a need to perform the prediction computation on the order of minutes, for example between 5 and 60 minutes. However, the example prediction entails large amounts of data, considering that each of Sojourning, Charge, and SOC has size equal to the product of the number of EVs, the number of ECSs, and the number of time-steps. The Exogenous data, which may include traffic congestion levels on thousands of road segments, as a timeseries, may be considered highly informationally complex. By using summarization to accelerate the prediction computation, it becomes possible to adjust the computation size within the available deadline and with controlled amounts of FOM performance degradation.

Referring again to FIG. 1, once a predictor dataset from predictor data repository 114 has been reduced by summarization module 116, the summarized dataset may be provided to and stored in summarized predictor data repository 118, as represented by signal 5. As noted above, the summarized dataset may comprise a set of m samples, which include one or more exemplar samples, each of which summarizes multiple samples from the full dataset.

The training of a predictor may then be performed by predictor training module 120 based on the summarized dataset in summarized predictor data repository 118. The summarized dataset may be provided to predictor training module 120, as represented by signal 6. Developing and training a predictor may be done in any suitable way(s). In general, in an embodiment, the predictor training module may use any suitable supervised machine learning and/or deep learning technique, such as for example multi-layer perceptron, decision-trees, to name but a few, that receives labeled historical data and trains a model(s) to predict the label(s) of the data.

In an embodiment, a format of the data in the summarized dataset may be different than the format of data in the original dataset. The computation, for example training of a predictor or optimizer, may be adapted to be compatible with the format of the data in the summarized dataset rather than with the original data format, where applicable. For instance, the training may be adapted to input or use the weight parameters in the summarized dataset.

As described above, a predictor may be or comprise a function that returns a label based input information. The input information may comprise a feature value and a configuration parameter or information w, where configuration w may include a mathematical structure and numerical parameters of predictor. Predictor training may include the process of choosing w. Error minimization using loss gradients may be used. In an embodiment, predictor training may use a collection of in triples (feature, label, weight), for example obtained from summarized predictor data repository 118. Label [k] may be Sojourning[k] and/or Charge[k], and feature[k] may include k, Sojourning[k-D . . . k-1], SOC [k-D . . . k-1], Charge [k-D . . . k-1], and/or Exogenous [k-D . . . k-1]. Here, k represents a time k, [1 . . . k-1] represents history and D represents past timesteps.

In an embodiment, predictor training module 120 may perform a search for a best w, for example by numerical optimization using gradient descent, where gradient at (feature_i, label_i) may be scaled by weight_i.

An output of predictor training module 120 may be a summarized predictor in the sense that the predictor has been trained on a summarized dataset. This may be in the form of a representation of predictor configuration w (at approximation level m), and may include a mathematical structure and numerical parameters of the predictor.

A trained predictor may be provided to and stored in trained predictor repository 122, as represented by signal 7. Further, a trained predictor may be provided to edge subsystem 160 for actual use in controlling EVs 190, as represented by signal 8. Further, a trained predictor may be provided to predictor performance module 124, as represented by signal 9, to assess the performance of the trained predictor.

Information in signal 7 and/or signal 8 and/or signal 9 may include a digital representation of the predictor configuration at approximation level m, and may include the mathematical structure of the predictor and numerical parameters.

In an embodiment where there is more than one trained predictor, one or more of the trained predictors may be provided to edge subsystem 160. Predictor 164 at edge subsystem 160 represents one or more trained predictors.

The performance of a trained predictor may be assessed by predictor performance module 124. The trained predictor may be provided to predictor performance module 124, as represented by signal 9. Predictor performance module 124 may use information from predictor data repository 114, as represented by signal 12. For example, this may include a full data history to time step k, comprising of feature[1 . . . k] and label[1 . . . k].

A figure of merit (FOM) value or score may be determined for the trained predictor. This may be referred to as a predictor FOM, or PFOM. Again, the predictor was trained using a summarized dataset that was generated using a specific summarization algorithm at predictor data summarization module 116. Accordingly, a different instance of the predictor that was trained using a different summarized dataset that was generated using a different specific summarization algorithm would likely result in a different FOM score.

Predictor performance module 124 may use the trained predictor with configuration Iv and feature[1 . . . k] to generate a predicted label [1 . . . k]. Predictor performance module 124 may then use a PFOM measure to compare predicted label [1 . . . k] with label Feature[1 . . . k] and label[1 . . . k] may have to be available for that calculation via signal 12 from module 114. Predicted label[1 . . . k] is available at module 124 by processing feature[1 . . . k] with a predictor configured according to w available from signal 9. For example, if the predictor is configured to predict EV charging demand, the PFOM may be calculated by comparing historical EV charging demands available in signal 12 to predicted historical EV charging demand. The comparison may take the form of an accumulated mathematical difference, or some other error statistic. It is to be understood that the PFOM may evaluate the predictor on any subset of the historical data, the choice to use the complete latest available features feature[1 . . . k] being merely an example of a test set. If the predictor is configured to predict EV or other asset charging interactions, the PFOM may be calculated by comparing actual historical charging interactions to predicted charging interactions. So, if the predictor is configured to predict EV charging sojourns, the PFOM may be calculated by comparing actual historical EV charging sojourns to predicted EV charging sojourns. Once the PFOM has been calculated, predictor performance module 124 may provide summarization level m and associated PFOM, for example in a format such as (m, PFOM[m]), to predictor summarization configuration module 126, as represented by signal 10. Further, predictor performance module 124 may provide information to optimizer experience repository 130, as represented by signal 13, for use in training an optimizer. The information may include, for example, a set of predicted labels to be used in relation to optimizer training, together with the features used to generate the prediction. A set of predicted labels may include predicted_label [1 . . . k] at summarization level m*. For example, in an embodiment, a distinction between signal 10 and signal 13 is that the PFOM is an explicit numerical measure of the merit of predictor configuration w, whereas signal 13 that may include all of (m, label[1 . . . k], feature[1 . . . k], predicted_label[1 . . . k]) is an implicit representation of predictor merit. The implicit representation enables construction of experiences in module 130 that may enable an optimizer 166 that makes use of predictions 164.

Summarization configuration module 126 may provide configuration information to predictor data summarization module 116, as previously described. Summarization configuration module 126 may support evaluating various summarization algorithms, and/or evaluating the performance of one or more predictors that have been trained on summarized datasets that were generated using particular summarization algorithms. Evaluating the performance of several predictor instances, where a predictor instance is a predictor trained using a specific summarized dataset, may be used to select a predictor instance having a preferred performance profile. A performance profile may be any suitable profile, for example a profile comprising or based on one or more of (PFOM, predictor training execution time, predictor training computer memory resource amount, etc.). It is to be appreciated that, in some circumstances, an optimal predictor based on all data may not be computable, and thus the best FOM may be unknown. Module 126 may allow the selection, by subjective or objective means, of a preferred predictor to be deployed to edge subsystem 160 via signal 8.

Figure 4:
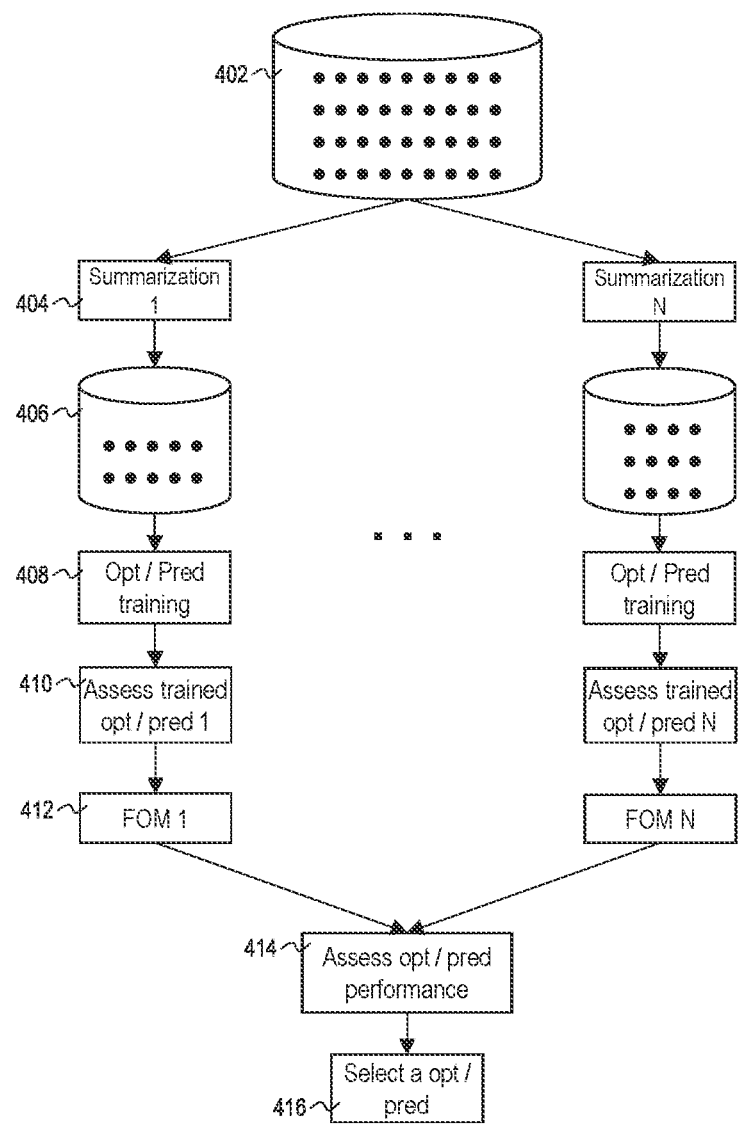
FIG. 4 is a diagram of an example of assessing and selecting one of a plurality of trained predictors or optimizers.

FIG. 4 is a diagram of an example illustrating this concept. Data from data repository or database 402, which may include historical and streaming EV related data, may be provided to summarization module 406, which performs a first summarization algorithm, summarization 1. A subset of the data selected by the summarization is stored in summarized data repository 406. The summarized data may then be used to train a first instance of a computation, such as an optimizer or predictor, at training module 408. A performance of the first trained instance of the computation may be assessed at assessment module 410 to generate a FOM score 412.

A similar process may be performed one or more additional times using different summarization algorithms on data from data repository or database 402. The performances of the trained instances of the computation may then be assessed using the respective FOM scores of each trained instance at assessment module 414. At least one of the trained instances may be selected at selection module 416 based on the output of assessment module 414.

A computational result, for example from a prediction or optimization, that is obtained by using the summarized data is generally somewhat reduced in quality due to a portion of the data having been ignored due to the summarization. The reduction in quality, or degradation, may be determined or assessed based on a FOM value associated with the computational result. In an embodiment, the FOM values of several trained predictor instances (or any other computation instances) may be compared, for example ranked, and one of the predictor instances may be selected. Further, in an embodiment, a first instance of a predictor may be trained using a first summarized dataset. The FOM value associated with the first instance of the predictor may then be assessed to gauge the performance of the first instance of the predictor, for example the FOM value may be compared to a baseline or threshold value. If the FOM value is determined to be acceptable, then the first instance of the predictor may be used at edge subsystem 160 in relation to controlling EVs 190 in the system. If the FOM value is determined to be not acceptable, then a second instance of a predictor may be trained using a second summarized dataset. The FOM value associated with the second instance of the predictor may then be used to assess the performance of the second instance of the predictor, and so on.

Some features, components and aspects relating to the training of a predictor have been described. Now, features, components and aspects relating to the training of an optimizer are described. Many of these features, components and aspects may be similar to those described herein in relation to the predictor, although some adaptations may be made for an optimizer rather than for a predictor.

FIG. 1 shows an optimizer training repository database 130, which may store data for potential use in relation to an optimizer, for example including one or more of third party historical data 102, EV historical data 104, planning configuration data 106, EV related streamed data 108, third party streamed data 109, and information from predictor performance module 124 as previously described.

Optimizer experience repository 130 may store various forms of data, including but not limited to streaming live and historical data, some of which may have been pre-processed by data processor 112 as represented by signal 3. At least some of the stored data may be represented as a set of experiences, for example, each may be a mathematical 4-tuple (state[i], action[i], state[i+1], reward[i]) where i is a particular timestep, state and action may have a fixed number of possible values, and reward is single number. State[i] and action[i] may depend on data in feature[1 . . . i], i<=k. The tuples may be parsed out of the content of feature [1 . . . k] in a manner designed to support optimal control of EVs, and possibly consistent with statistical methodology of reinforcement learning. Data processor 112 may format or organize data received at center subsystem 110 into desired formats, such as those described above.

Optimizer data summarization module 132 may receive data from optimizer experience repository 130, as represented via signal 14, and may perform a data summarization algorithm on the data. Generally, the summarization algorithm may involve creating or selecting a subset of data from a larger data set where the subset acts as a summary of the larger data set. In this regard, the summarization of data for use in relation to an optimizer may generally be similar in technique to the summarization of data for use in relation to a predictor, as described herein. However, the exact summarization algorithms may differ as between a predictor and an optimizer since the nature and/or format of the data being summarized may differ.

As described above in relation to the predictor, in an embodiment, summarization replaces n instances of (feature, label), with m instances of ((feature, label), weight). In the context of optimizer training, in an embodiment, a standard machine learning data representation may be (state, action, state', reward), which may be referred to as an experience. Here, (state, action) may exist at some time step, and (state', reward) at a next time step. These experiences may include experiences of EVs 190 in the system. A plurality of these experiences may be stored in the optimizer training repository database 130, and n experiences may be provided to optimizer data summarization module 132 to be summarized to select or generate m instances in the reduced, or "summarized", dataset, where n>m. The parameter m represents a desired summary size, meaning the number of samples that are desired in the summarized dataset. The m experiences, which may be stored in the summarized optimizer data repository 134, may have the form of ((state, action, state', reward), weight). As with the summarization in relation to the predictor, here the "weight" may be associated with the number of data points, for example experiences, in the received dataset that the given datapoint or experience is summarizing.

Optimizer data summarization steps may be interleaved in time with optimizer training steps. Summarized optimizer data repository 134 may be regenerated one or more times by the summarization algorithm at optimizer data summarization module 132 as part of optimizer training 136. The optimizer data summarization module 132 may process all experiences in optimizer experience repository 130 on each update or only a portion of the experiences. Various interleaving patterns are sometimes designated epoch, batch, mini-batch, inner loop, outer loop, etc. in the art. FIG. 1 shows a specific non-limiting example in which summarization is configured at outer loop nesting level.

Further, optimizer data summarization module 132 may receive configuration information for configuring the summarization algorithm, for example from summarization configuration module 142, as represented by signal 21. As with previously mentioned predictor summarization configuration module 126, configuration information signal 21 may include, for example, a desired output dataset size m, which may also be referred to as summarization level m, and/or a time limit allowed to compute the summarization. Other possible configuration information may include the specific summarization algorithm, examples algorithms being coreset and data-sketch, configuration parameters for a summarization algorithm, and/or other configuration information such as the previously described interleaving strategy within optimizer training process where summarization may occur.

Once an optimizer dataset from optimizer experience data repository 130 has been reduced by summarization module 132, the summarized dataset may be stored in summarized optimizer data repository 134, as represented by signal 15.

The training of an optimizer may then be performed by optimizer training module 136 based on the summarized dataset in summarized optimizer data repository 134. The summarized dataset may be provided to optimizer training module 136, as represented by signal 16. Developing and/or training an optimizer may be done in any suitable way(s). In general, in an embodiment, the optimizer training module may use any suitable supervised machine learning and/or deep learning technique and/or reinforcement learning technique, such as for example multi-layer perceptron, decision-trees, to name but a few, that receives labeled historical data and trains a model(s) to predict the label(s) of the data.

An example of the adaptation of optimizer training to make use of summarized data is now described. Optimizer training may proceed by an iteration of updates and each update brings about changes in optimizer parameters that are associated to gradual improvements of OFOM. The change in parameters may be called the model update. In an embodiment, the model update may be a mathematical sum of individual contributions each associated to a specific experience. Again, in that example embodiment, the total change in parameter values at each update is comprised of parts that are attributable to individual experiences. An experience may be referred by an index v. A v-th experience may have unsummarized form (state_v, action_v, state'_v, rewart_v) and summarized form (state_y, action_v, state'_v, reward weight_v). An example manner of adapting optimizer training to use summarized data may be to scale the update contribution of the v-th experience by the quantity weighty.

An output of optimizer training module 136 may be a summarized optimizer in the sense that the optimizer has been trained on a summarized dataset. A trained optimizer may be provided to and stored in trained optimizer repository 138, as represented by signal 17. Further, a trained optimizer may be provided to edge subsystem 160 for actual use in EVs 190, as represented by signal 18. In an embodiment where there is more than one trained optimizer, one or more of the trained optimizers may be provided to edge subsystem 160. Optimizer 166 at edge subsystem 160 represents one or more trained optimizers. Further, a trained optimizer may be provided to optimizer performance module 140, as represented by signal 19, to assess the performance of the trained optimizer.

Information in signal 17 and/or signal 18 and/or signal 19 may include a digital representation of the optimizer configuration at approximation or summarization level 311, and may include the mathematical structure of the optimizer and/or numerical parameters for example weights, biases, and/or data tables.

Further, optimizer performance module 140 may use information from optimizer experience data repository 130, as represented by signal 22. For instance, this information may include historical experience data for use in assessing a trained optimizer. For example, this information may include a full data history to time step k, comprising of feature[1 . . . k] expressed as experiences. Further, in an embodiment, the information may include SOC, Grouping, and/or Planning information, for example sufficient to calculate baseline performance scores of, for example, one or more of SOC level at vehicle departure, and/or Planning constraint violations. However, it is to be appreciated that these types of information are only examples and are thus not meant to be limiting.

A figure of merit (FOM) value or score may be determined for the trained optimizer. This may be referred to as an optimizer FOM, or OFOM. Again, the optimizer was trained using a summarized dataset that was generated using a specific summarization algorithm at optimizer data summarization module 132, for example using a specific summarization level m. Accordingly, a different instance of the optimizer that was trained using a different summarized dataset that was generated using a different specific summarization algorithm would likely result in a different OFOM score. The OFOM may have more than one component, for example average SOC may be a component, and Planning constraint margins may be components of the same OFOM.

Optimizer performance module 140 may use the trained optimizer and experience data from optimizer experience data repository 130 to generate control decisions, for example vehicle charging decisions. Further, resulting SOC levels and/or Planning constraint margins may be generated. In an example, if the optimizer is configured to generate control decisions in the form of charging rates for EVs 190, this can be done using forecasts of historical sojourns and the average SOC together with grid substation peak load can be a FOM for a specific historical period. Module 140 may perform the same evaluation on distinct trained optimizers such that the OFOM results are meaningfully comparable.

Once an OFOM has been calculated for the given trained optimizer, optimizer performance module 140 may provide summarization level in and associated OFOM, for example in a format such as (m, OFOM[m]), to optimizer summarization configuration module 142, as represented by signal 20. Further, info provided to optimizer summarization configuration module 142 may include one or more performance components, for example, SOC level at vehicle departure from a ECS and/or Planning constraint violations.

Further, summarization configuration module 142 may support evaluating various summarization algorithms, and/or evaluating the performance of one or more optimizers that have been trained on summarized datasets that were generated using particular summarization algorithms. Evaluating the performance of several optimizer instances, where an optimizer instance may be an optimizer trained using a specific summarized dataset, may be used to select an optimizer instance having a preferred performance for deployment and use at edge subsystem 160. What is considered to be preferred may be a design parameter and may thus vary from embodiment to embodiment. In an embodiment, various optimizer instances may be trained each using a different summarized dataset that was generated at a different summarization level m. It will be appreciated that what is considered best may differ depending on the particular implementation, as noted above in relation to the predictor.

System 100 may provide for control of controllable assets by providing information, for example relating to a trained optimizer, to edge subsystem 160. However, information for controlling assets 190 may be provided to assets 190 in ways other than those shown in FIG. 1. Further, edge subsystem 160 may provide for control of assets 190 using optimizer 166. Optimizer 166 may generate control decisions or actions based on optimization computations, such control decisions or actions may be communicated to assets 190, for example via signal 27. Further, optimizer 166 may be adapted to perform operations other than optimization computations, for example other processing and/or control functions. Further, center subsystem 110 and/or edge subsystem 160 may provide for control of assets 190 in other ways, for example by providing control decisions or actions, or other control related information (such as planning limits), to assets 190.

An example of assessing the performance of a predictor or optimizer that was trained using a particular summarized dataset, and selecting at least one of the predictors or optimizers, for example having the best performance or a preferred performance, was described above in relation to FIG. 4.

Edge subsystem 160 is now described.

Once the optimizer(s) and/or predictor(s) have been trained by central subsystem 110, they may be communicated to, or otherwise made available to, edge subsystem 160. Edge subsystem 160 may generally comprise at least one or more of a data processor module 162, predictor module 164, and optimizer module 166. Edge subsystem 160 may be adapted to receive data from EVs 190, as represented by signal 26, such as streaming data, and/or data possibly from other sources such as third party data 109, as represented by signal 28.

Data from or relating to EVs 190 may include data or measurements of EVs 190 updated each time step k. This data may include one or more of data relating to transactions (for example EV identification(ID), ECS ID, EV start EV arrival time at ECS, EV departure time from ECS, EV start charge time, EV end charge time), and EV fault conditions.

Streaming data may include streaming updates of exogenous data, for example information relating to road traffic, grid congestion, forecasted and/or actual weather, day-type, geo-specific cultural events, infrastructure schedules (for example dams, bridges, trains, etc.), electric grid configuration changes, and fault info.

Data processor module 162 may generally be similar in function to data processor module 112 of center subsystem 110. As such, data processor module 162 may perform operations on data received by edge subsystem 160, such as data from EVs 190 and/or data possibly from other sources, Module 162 may, at each time step k, parse received data to construct one or more of feature[k], grouping[k], planning [k], and or the optimizer state that is part of the previously mentioned (state, action), now here called state[k].

Feature[k] may comprise values of D-step data history of, for example, one or more of Sojourning, SOC, Charge and Exogenous data, where the data has been formatted for use by predictor 164. This data may include information relating to road traffic, grid congestion, weather, day-type, geo-specific cultural events, infrastructure schedules (for example dams, bridges, trains).

Grouping[k] may comprise information relating to assignments of ECS to groups, for example particular ECSs in a neighbourhood to a particular substation, at time k. In a mere example, each grid substation may have a designation g, and set of ECS that are connected to the substation at time k, and this information may be available in Grouping[k].

Planning[k] may comprise information relating to, for example, grid planning constraints known at time k, up to some H-step horizon k+H. In a mere example, k is hour of day, and H is 3 hours. Two mere examples include Planning [k]=L[g, k . . . k+H] that represents a planned hourly limit on the maximum power that substation g provides to ECSs for the next 3 hours, and Planning[k]=R[g, k . . . k+H] that represents a similarly formatted limit on the rate of change of power at substation g. Planning[k] may include multiple such plans.

Information outputted from data processor module 162, for example grouping[k] and/or planning[k], may be provided to optimizer module 166, as represented by signal 25. Further, information outputted from data processor module 162, for example feature[k], may be provided to predictor 164, as represented by signal 23, when a predictor is operating at edge subsystem 160.

Predictor module 164 may comprise one or more trained predictors received from center subsystem 110. Again, a predictor at predictor module 164 may be used to predict a label value(s) for data to be used by optimizer 166. Again, predictor 164 may have a configuration w, and may perform a prediction function f to predict label[k], for example predicted label[k]=f(feature[k], vii), wherein predicted label[k] may be a prediction of label[k]. In an example, the label[k] may be an EV sojourn state, and may optionally include whether the EV charges at the next time step. Further, predicted label[k] may include a probability of the EV terminating an existing charging session by leaving the ECS, and/or a probability of the EV arriving at a different ECS. In an example embodiment, feature[k] may include one or more of Sojourning[k–D_k–1], SOC [k–D_k–1], Charge [k–D . . . k–1], Exogenous [k–D . . . k–1]. Prediction configuration w may include feature selection so that feature [k] may be a column- or row-subset of the D-step data history. Time-series data transformation techniques such as lag, difference, and seasonality transform may be used.

In an embodiment where system 100 is configured to use multiple labels, predictor module 164 may include a predictor for each label. Predicted label values for data received at edge subsystem 160, for example predicted label[k], may be provided to optimizer 166, as represented by signal 24, for use in the optimization.

Optimizer module 166 may receive information, for example, information outputted from data processor module 162, for example grouping[k] and/or planning[k], as represented by signal 25, as described above. Further, optimizer module 166 may receive information from predictor 164, for example, predicted label[k], as represented by signal 24.

Optimizer module 166 may comprise one or more trained machine learning optimizers, which may be configured to solve a control optimization problem(s) related to EVs 190, for example by minimizing a cost function or maximizing a reward function. An optimizer may be of any suitable type, for example: Linear Program, Mixed Integer Nonlinear Program, Data Driven Optimizer, Stochastic Programming etc. Once an optimal value(s) of a decision variable is determined, assets 190 may be controlled based on the optimal value, for example by providing the optimal value and/or indicating actions to EVs 190, as represented by signal 27. In a mere example, an optimization parameter may be charge[k], representing charging power from an ECS to EV j at time k, and may include charging and discharging, An ECS is a mere example of an energy asset and some ECS systems support bi-directional energy flow. In an example, a fully charged EV can share power to another EV via an ECS grid connection, and this transfer may occur at the edge of the grid distribution network in a manner that is beneficial to the utility by a reduction of long-distance energy transmission. For example, in the event that a charged EV is not in use, system 100 may cause for the control the EV to discharge through a compatible ECS to obtain a benefit of improved grid system performance.

In an embodiment, the optimization objective(s) corresponds to the label(s) used in system 100. For instance, if system 100 is configured to minimize the cost of electric charging of EVs, system 100 may be configured to have a corresponding label field associated with the historical and streaming data.

An optimization may be subject to one or more parameters, such as planning constraints. In an example, planning constraints may be based on groups of ECSs. C[g, k] may be total charge power of all ECS in group g at time k. Group power constraint L, where L[g k] is power limit for group g at time step k, and planning target is C[g, k]<L[g k]. Group ramp constraint R, where R[g, k] is ramp limit for group g at time step k, and planning target is abs(C[g, k]–C[g, k–1]) <R[g, k]. An objective may be to choose a charge rate to satisfy planning requirements and to maximize SOC at time of sojourn disconnection.

In an embodiment, as shown in FIG. 1, edge subsystem 160 may comprise a plurality of edge modules 160a, 160b, 160c. In this example, there are 3 edge modules, but this is not limiting in any way. Each edge module may comprise one or more of: data processor modules 162, predictor modules 164, and/or optimizer modules 166. Each edge module may communicate with center subsystem 110 and/or EVs 190 and/or with each other, and may receive data from one or more other sources, such as one or more of sources 102, 104, 106, 108, 109, 190. In an embodiment, two or more edge modules may be configured to operate in parallel.

In an embodiment, one or more of the edge modules may be a primary control edge module(s) for controlling EVs 190, meaning this edge module may exercise some central or overall control relative to the other edge module(s). This module may be referred to as a control edge module. In the embodiment of FIG. 1, the control module may be edge module 160a. Output(s) of one or more of other edge modules 160b, 160c may be provided to the control edge module for use as inputs for controlling EVs 190.

Edge module(s), such as control edge module 160a, may comprise, for example, one or more electronic or other computer processors, computer memories, computer storage devices for storing one or more databases, and/or other computer hardware, and/or computer readable instructions executable by the processor(s) for causing operations and functions according to those herein described. Each of the other predictor edge modules 160b, 160c may be software modules, or may comprise both computer software and hardware. One or more edge modules 160a, 160b, 160c may be located remotely from center subsystem 100, and/or remotely from other edge modules.

Other edge modules) may comprise a predictor module(s), which may be used to estimate parameters that may be used in relation to solving the control or optimization problem. These modules may be referred to as a predictor edge modules. The predictors in predictor modules may comprise trained machine learning systems for predicting their respective parameters, or may comprise any other suitable prediction techniques.

Similarly, one or more other edge modules may comprise one or more optimizers for solving any optimization problem related to the overall control of EVs 190. The optimizer(s) may comprise trained machine learning systems for optimizing one or more target optimization parameters, or may comprise or implement any other optimization technique.

Further, as noted above, edge modules may comprise any suitable combination of various types of modules.

It is to be appreciated that, in other embodiments, the number of edge modules may be higher or lower, and/or the functions, operations, and/or structures of the edge modules may be allocated and configured differently from those shown and described herein.

Figure 5:
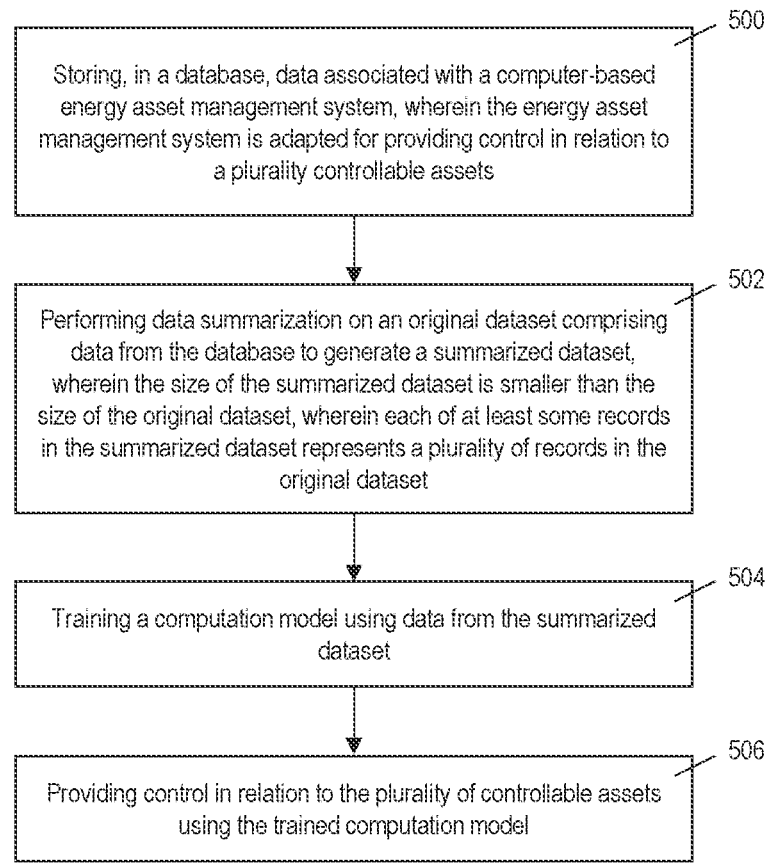
FIG. 5 is a process flow diagram of an example method.

FIG. 5 is a process flow diagram of an example method. The example method may be performed at or by one or more electronic devices each having one or more processors and memory.

At block 500, the process may involve storing, in a database, data associated with a computer-based energy asset management system. The energy asset management system may be adapted for providing control in relation to a plurality controllable assets.

At block 504, the process may involve performing data summarization on an original dataset comprising data from the database to generate a summarized dataset. The size of the summarized dataset is smaller than the size of the original dataset. Each of at least some records in the summarized dataset represents a plurality of records in the original dataset.

At block 506, the process may involve training a computation model using data from the summarized dataset. The computation model may comprise, for example, one or more of an optimizer and a predictor.

At block 508, the process may involve providing control in relation to the plurality of controllable assets using the trained computation model.

In some embodiments, algorithms, techniques, and/or approaches according to the present disclosure may be performed or based on artificial intelligence (AI) algorithms, techniques, and/or approaches. This includes but is not limited to predictors and/or optimizers according to the present disclosure, as well as controlling of controllable assets.

In some embodiments, the AI algorithms and techniques may include machine learning techniques.

Machine Learning (ML) may be used in power or energy systems, including energy asset management systems, with penetration of renewable energy such as wind, solar, or tidal energy, to improve the utilization of variable renewable resources and coordinate consumption/demand. Machine learning models may be used, as a mere example, to predict future resource availability and demand requirements, and/or control assets in a system, for instance using one or more optimizations. Predictions may be used to control or schedule charging interactions, to schedule EV charging, energy generation, storage, and/or pricing to optimally coordinate these energy systems to achieve various objectives such as cost minimization, efficiency maximization, or optimal use of local renewable energy. Further, predictors and/or optimizers, and the training thereof, may also use or be based on machine learning techniques.

A machine learning algorithm or system may receive data, for example historical data, streaming controllable asset data, environmental data, and/or third party data, and, using one or more suitable machine learning algorithms, may generate one or more machine learning datasets. Example types of machine learning algorithms include but are not limited to supervised learning algorithms, unsupervised learning algorithms, reinforcement learning algorithms, semi-supervised learning algorithms (e.g. where both labeled and unlabeled data is used), regression algorithms (for example logistic regression, linear regression, and so forth), regularization algorithms (for example least-angle regression, ridge regression, and so forth), artificial neural network algorithms, instance based algorithms (for example locally weighted learning, learning vector quantization, and so forth), Bayesian algorithms, decision tree algorithms, clustering algorithms, and so forth. Further, other machine learning algorithms may be used additionally or alternatively. In some embodiments, a machine learning algorithm or system may analyze data to identify patterns and/or sequences of activity, and so forth, to generate one or more machine learning datasets.

An energy asset management system may comprise one or more control policies. The control policies of the system may be based on trained machine learning systems. In this sense, a control policy may be part of a control agent. A control agent observes its environment, herein referred to a control environment, and takes action based on its observations, or percepts, of the control environment. The taking of action is referred to as controlling the system. Depending on the state of the environment, taking action may involve taking no action at all, for example if there has been little or no change in the state since the last time the agent took action. Thus, doing nothing is a valid action in a set of actions in the action space of the controller. The present systems and methods may exploit the flexibility of controllable assets in the power system to achieve improved performance of the system. For example, the flexibility of controllable assets may be exploited in response to changes in the control environment.

In an embodiment, online machine learning may be employed. Online machine learning is a technique of machine learning where data becomes available sequentially over time. The data is utilized to update a predictor for future data at each step in time (e.g. time slot). This approach of online machine learning may be contrasted to approaches that use batch learning wherein learning performed on an entire training data set. Online machine learning is sometimes useful where the data varies significantly over time, such as in power or energy pricing, commodity pricing, and stock markets. Further, online machine learning may be helpful when it is not practical or possible to train the agent over the entire data set.

Figure 6:
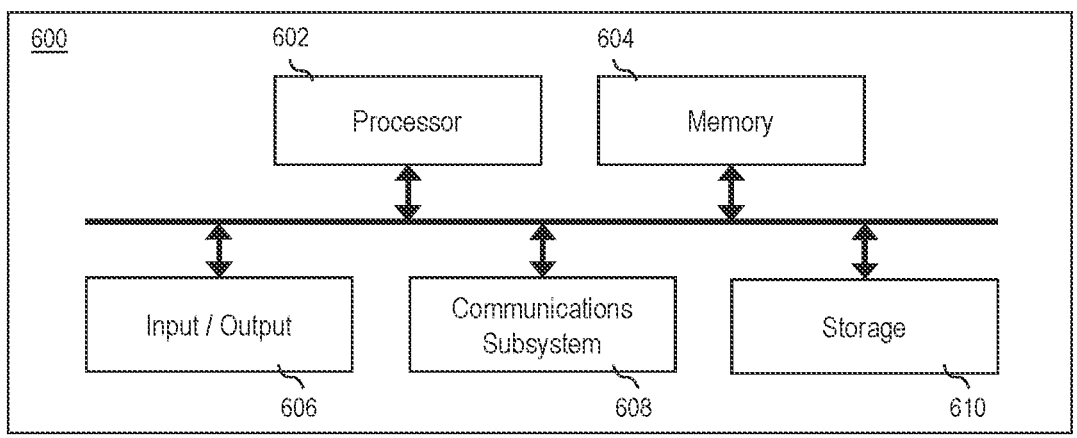
FIG. 6 is a block diagram of an example computerized device or system.

In embodiments according to the present disclosure, optimizer training may be based on offline learning and/or online learning where the streaming real-time data is combined with a sampled subset from summarized optimizer repository 134 to train the optimizer in real-time. In offline learning, the all the data in 134 is used for training of the optimizer, FIG. 6 is a block diagram of an example computerized device or system 600 that may be used in implementing one or more aspects or components of an embodiment according to the present disclosure. For example, system 600 may be used to implement a computing device or system, such as a controller, to be used with a device, system or method according to the present disclosure. Thus, one or more systems 600 may be configured to implement one or more portions of system 100 or system 100 in its entirety. This includes center subsystem 110 and/or edge subsystem 160, and/or edge modules 160a, 160b, 160c.

Computerized system 600 may include one or more of a computer processor 602, memory 604, a mass storage device 610, an input/output (I/O) interface 606, and a communications subsystem 608. A computer processor device may be any suitable device(s), and encompasses various devices, systems, and apparatus for processing data and instructions. These include, as examples only, one or more of a programmable processor, a computer, a system on a chip, and special purpose logic circuitry such as an ASIC (application-specific integrated circuit) and/or FPGA (field programmable gate array).

Memory 604 may be configured to store computer readable instructions, that when executed by processor 602, cause the performance of operations, including operations in accordance with the present disclosure.

One or more of the components or subsystems of computerized system 600 may be interconnected by way of one or more buses 612 or in any other suitable manner.

The bus 612 may be one or more of any type of several bus architectures including a memory bus, storage bus, memory controller bus, peripheral bus, or the like. The CPU 602 may comprise any type of electronic data processor. The memory 604 may comprise any type of system memory such as dynamic random access memory (DRAM), static random access memory (SRAM), synchronous DRAM (SDRAM), read-only memory (ROM), a combination thereof, or the like. In an embodiment, the memory may include ROM for use at boot-up, and DRAM for program and data storage for use while executing programs.

The mass storage device 610 may comprise any type of storage device configured to store data, programs, and other information and to make the data, programs, and other information accessible via the bus 612. In particular, device 610 may be configured to store one or more of repositories/databases 114, 118, 122, 130, 134, 138 of system 100. The storage device may be adapted to store one or more databases and/or data repositories, each of which is generally an organized collection of data or other information stored and accessed electronically via a computer. The term database or repository may thus refer to a storage device comprising a database. The mass storage device 610 may comprise one or more of a solid state drive, hard disk drive, a magnetic disk drive, an optical disk drive, or the like. In some embodiments, data, programs, or other information may be stored remotely, for example in the cloud. Computerized system 600 may send or receive information to the remote storage in any suitable way, including via communications subsystem 608 over a network or other data communication medium.

The I/O interface 606 may provide interlaces for enabling wired and/or wireless communications between computerized system 600 and one or more other devices or systems, such as an electric vehicle charging system according to the present disclosure. Furthermore, additional or fewer interfaces may be utilized. For example, one or more serial interfaces such as Universal Serial Bus (USB) (not shown) may be provided. Further, system 600 may comprise or be communicatively connectable to a display device, and/or speaker device, a microphone device, an input device such as a keyboard, pointer, mouse, touch screen display or any other type of input device.

Computerized system 600 may be used to configure, operate, control, monitor, sense, and/or adjust devices, systems, and/or methods according to the present disclosure.

A communications subsystem 608 may be provided for one or both of transmitting and receiving signals over any form or medium of digital data communication, including a communication network. Examples of communication networks include a local area network (LAN), a wide area network (WAN), an inter-network such as the Internet, and peer-to-peer networks such as ad hoc peer-to-peer networks. Communications subsystem 608 may include any component or collection of components for enabling communications over one or more wired and wireless interfaces. These interfaces may include but are not limited to USB, Ethernet (e.g. IEEE 802.3), high-definition multimedia interlace (HDMI), Firewire™ (e.g. IEEE 1374), Thunderbolt™, WiFi™ (e.g. IEEE 802.11), WiMAX (e.g. IEEE 802.16), Bluetooth™, or Near-field communications (NFC), as well as CPRS, UMTS, LTE, LTE-A, and dedicated short range communication (DSRC). Communication subsystem 608 may include one or more ports or other components (not shown) for one or more wired connections. Additionally or alternatively, communication subsystem 608 may include one or more transmitters, receivers, and/or antenna. Further, computerized system 600 may comprise clients and servers (none of which are shown).

Computerized system 600 of FIG. 6 is merely an example and is not meant to be limiting. Various embodiments may utilize some or all of the components shown or described. Some embodiments may use other components not shown or described but known to persons skilled in the art.

The concepts of real-time and near real-time may be defined as providing a response or output within a predetermined time interval, usually a relatively short time. A time interval for real-time is generally shorter than an interval for near real-time, Mere non-limiting examples of predetermined time intervals may include the following as well as values below, between, and/or above these figures: 10 s, 60 s, 5 min, 10 min, 20 min, 30 min, 60 min, 2 hr, 4 hr, 6 hr, 8 hr, 10 hr, 12 hr, 1 day.

Center subsystem 110 and edge subsystem 160 may be implemented on a single computing device, on separate computing devices, or on several computing devices. In an embodiment, center subsystem 110 and edge subsystem 160 may be implemented in a distributed computing system wherein operations are performed at each of two or more computing devices. Other options and configurations are possible.

In other embodiments, the functions, operations, and/or structures of center subsystem 110 and edge subsystem 160 may not be divided as between the two subsystems 110 and 160 as shown and described with reference to FIG. 1. For example, some or all of the functions, operations, and/or structures of edge subsystem 160 may be located or performed at center subsystem 110. Alternatively, some or all of the functions, operations, and/or structures of center subsystem 110 may be located or performed at edge subsystem 160. Alternatively, the system could have only a single subsystem, which has all of the functions, operations, and/or structures of both subsystems 110, 160 described herein. Other configurations are also possible and contemplated.

The term module used herein may refer to a software module, a hardware module, or a module comprising both software and hardware. Generally, software includes computer executable instructions, and possibly also data, and hardware refers to physical computer hardware.

Embodiments and operations according to the present disclosure may be implemented in digital electronic circuitry, and/or in computer software, firmware, and/or hardware, including structures according to this disclosure and their structural equivalents. Embodiments and operations according to the present disclosure may be implemented as one or more computer programs, for example one or more modules of computer program instructions, stored on or in computer storage media for execution by, or to control the operation of, one or more computer processing devices such as a processor. Operations according to the present disclosure may be implemented as operations performed by one or more processing devices on data stored on one or more computer-readable storage devices or media, and/or received from other sources.

In the preceding description, for purposes of explanation, numerous details are set forth in order to provide a thorough understanding of the embodiments. However, it will be apparent to one skilled in the art that these specific details are not required. In other instances, wed-known electrical structures and circuits are shown in block diagram form in order not to obscure the understanding. For example, specific details are not necessarily provided as to whether the embodiments described herein are implemented as a computer software, computer hardware, electronic hardware, or a combination thereof.

In at least some embodiments, one or more aspects or components may be implemented by one or more special-purpose computing devices. The special-purpose computing devices may be any suitable type of computing device, including desktop computers, portable computers, handheld computing devices, networking devices, or any other computing device that comprises hardwired and/or program logic to implement operations and features according to the present disclosure.

Embodiments of the disclosure may be represented as a computer program product stored in a machine-readable medium (also referred to as a computer-readable medium, a processor-readable medium, or a computer usable medium having a computer-readable program code embodied therein). The machine-readable medium may be any suitable tangible, non-transitory medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations may also be stored on the machine-readable medium. The instructions stored on the machine-readable medium may be executed by a processor or other suitable processing device, and may interface with circuitry to perform the described tasks.

The structure, features, accessories, and alternatives of specific embodiments described herein and shown in the Figures are intended to apply generally to all of the teachings of the present disclosure, including to all of the embodiments described and illustrated herein, insofar as they are compatible. In other words, the structure, features, accessories, and alternatives of a specific embodiment are not intended to be limited to only that specific embodiment unless so indicated.

In addition, the steps and the ordering of the steps of methods and data flows described and/or illustrated herein are not meant to be limiting. Methods and data flows comprising different steps, different number of steps, and/or different ordering of steps are also contemplated. Furthermore, although some steps are shown as being performed consecutively or concurrently, in other embodiments these steps may be performed concurrently or consecutively, respectively.

For simplicity and clarity of illustration, reference numerals may have been repeated among the figures to indicate corresponding or analogous elements. Numerous details have been set forth to provide an understanding of the embodiments described herein. The embodiments may be practiced without these details. In other instances, well-known methods, procedures, and components have not been described in detail to avoid obscuring the embodiments described.

The embodiments according to the present disclosure are intended to be examples only. Alterations, modifications and variations may be effected to the particular embodiments by those of skill in the art without departing from the scope, which is defined solely by the claims appended hereto.

The invention claimed is:

1. A method comprising:
at one or more electronic devices each having one or more processors and memory:
storing, in a database, data associated with a computer-based energy asset management system, wherein the energy asset management system is adapted for providing control in relation to a plurality controllable assets, wherein the controllable assets include electric vehicles (EVs);
performing data summarization on an original dataset comprising data from the database to generate a summarized dataset, wherein the size of the summarized dataset is smaller than the size of the original dataset, wherein each of at least some records in the summarized dataset represents a plurality of records in the original dataset;
training a computation model using data from the summarized dataset, wherein the computation model comprises a predictor, wherein the training involves training the predictor using data from the summarized dataset;
generating predictions relating to charging interactions of EVs; and
providing control in relation to the plurality of controllable assets using the trained computation model, wherein the providing control involves using predictions generated by the trained predictor, and wherein the providing control is based on the predictions relating to charging interactions of EVs.

2. The method of claim 1, further comprising:
performing data summarization multiple times with different summarization algorithms to generate multiple summarized datasets;
training each of a multiple of instances of the computation model with a different one of the multiple summarized datasets;
assessing the multiple trained instances of the computation model; and
selecting at least one of the trained instances of the computation model based on the assessing,
wherein the trained computation model for the providing control in relation to the plurality of controllable assets is the selected trained instance of the computation model.

3. The method of claim 1, wherein the generating predictions relating to charging interactions of EVs is based on road traffic information.

4. The method of claim 1, wherein the generating predictions relating to charging interactions of EVs is based on weather related information.

5. A method comprising:
at one or more electronic devices each having one or more processors and memory:
storing, in a database, data associated with a computer-based energy asset management system, wherein the energy asset management system is adapted for providing control in relation to a plurality controllable assets, wherein the controllable assets include electric vehicles (EVs);

performing data summarization on an original dataset comprising data from the database to generate a summarized dataset, wherein the size of the summarized dataset is smaller than the size of the original dataset, wherein each of at least some records in the summarized dataset represents a plurality of records in the original dataset;

training a computation model using data from the summarized dataset, wherein the computation model comprises an optimizer, wherein the training involves training the optimizer using data from the summarized dataset; and providing control in relation to the plurality of controllable assets using the trained computation model, wherein the providing control involves using the trained optimizer, and wherein the providing control using the trained optimizer involves scheduling of charging interactions for EVs.

6. The method of claim 5, wherein the computation model comprises a predictor, wherein the training involves training the predictor using data from the summarized dataset, and wherein the providing control involves using predictions generated by the trained predictor.

7. The method of claim 6, wherein the method further comprising generating predictions relating to charging interactions of EVs, wherein the providing control is based on the predictions relating to charging interactions of EVs.

8. A system, comprising:
one or more processors; and
memory storing instructions for execution by the one or more processors, the instructions for operations comprising:
storing, in a database, data associated with a computer-based energy asset management system, wherein the energy asset management system is adapted for providing control in relation to a plurality controllable assets, wherein the controllable assets include electric vehicles (EVs);

performing data summarization on an original dataset comprising data from the database to generate a summarized dataset, wherein the size of the summarized dataset is smaller than the size of the original dataset, wherein each of at least some records in the summarized dataset represents a plurality of records in the original dataset;

training a computation model using data from the summarized dataset, wherein the computation model comprises a predictor, wherein the training involves training the predictor using data from the summarized dataset;

generating predictions relating to charging interactions of EVs; and providing control in relation to the plurality of controllable assets using the trained computation model, wherein the providing control involves using predictions generated by the trained predictor, and wherein the providing control is based on the predictions relating to charging interactions of EVs.

9. The system according to claim 8, the instructions for operations further comprising:
performing data summarization multiple times with different summarization algorithms to generate multiple summarized datasets;

training each of a multiple of instances of the computation model with a different one of the multiple summarized datasets;

assessing the multiple trained instances of the computation model; and selecting at least one of the trained instances of the computation model based on the assessing, wherein the trained computation model for the providing control in relation to the plurality of controllable assets is the selected trained instance of the computation model.

10. The system according to claim 8, wherein the generating predictions relating to charging interactions of EVs is based on at least one of road traffic information and weather related information.

11. A system, comprising:
one or more processors; and
memory storing instructions for execution by the one or more processors, the instructions for operations comprising:
storing, in a database, data associated with a computer-based energy asset management system, wherein the energy asset management system is adapted for providing control in relation to a plurality controllable assets, wherein the controllable assets include electric vehicles (EVs);

performing data summarization on an original dataset comprising data from the database to generate a summarized dataset, wherein the size of the summarized dataset is smaller than the size of the original dataset, wherein each of at least some records in the summarized dataset represents a plurality of records in the original dataset;

training a computation model using data from the summarized dataset, wherein the computation model comprises an optimizer, wherein the training involves training the optimizer using data from the summarized dataset; and providing control in relation to the plurality of controllable assets using the trained computation model, wherein the providing control involves using the trained optimizer, and wherein the providing control using the trained optimizer involves scheduling of charging interactions for EVs.

12. The system according to claim 11, wherein the computation model comprises a predictor, wherein the training involves training the predictor using data from the summarized dataset, and wherein the providing control involves using predictions generated by the trained predictor.

13. The system according to claim 12, wherein the method further comprising generating predictions relating to charging interactions of EVs, wherein the providing control is based on the predictions relating to charging interactions of EVs.

14. A non-transitory computer-readable medium having computer-readable instructions stored thereon, the computer-readable instructions executable by at least one processor to cause the performance of operations comprising:
storing, in a database, data associated with a computer-based energy asset management system, wherein the energy asset management system is adapted for providing control in relation to a plurality controllable assets, wherein the controllable assets include electric vehicles (EVs);

performing data summarization on an original dataset comprising data from the database to generate a summarized dataset, wherein the size of the summarized dataset is smaller than the size of the original dataset, wherein each of at least some records in the summarized dataset represents a plurality of records in the original dataset;

training a computation model using data from the summarized dataset, wherein the computation model comprises a predictor, wherein the training involves training the predictor using data from the summarized dataset;

generating predictions relating to charging interactions of EVs; and providing control in relation to the plurality of controllable assets using the trained computation model, wherein the providing control involves using predictions generated by the trained predictor, and wherein the providing control is based on the predictions relating to charging interactions of EVs.

15. The non-transitory computer-readable medium according to claim 14, the computer-readable instructions for operations further comprising:

performing data summarization multiple times with different summarization algorithms to generate multiple summarized datasets;

training each of a multiple of instances of the computation model with a different one of the multiple summarized datasets;

assessing the multiple trained instances of the computation model; and selecting at least one of the trained instances of the computation model based on the assessing, wherein the trained computation model for the providing control in relation to the plurality of controllable assets is the selected trained instance of the computation model.

16. The non-transitory computer-readable medium according to claim 14, wherein the generating predictions relating to charging interactions of EVs is based on road traffic information.

17. The non-transitory computer-readable medium according to claim 14, wherein the generating predictions relating to charging interactions of EVs is based on weather related information.

18. A non-transitory computer-readable medium having computer-readable instructions stored thereon, the computer-readable instructions executable by at least one processor to cause the performance of operations comprising:

storing, in a database, data associated with a computer-based energy asset management system, wherein the energy asset management system is adapted for providing control in relation to a plurality controllable assets, wherein the controllable assets include electric vehicles (EVs);

performing data summarization on an original dataset comprising data from the database to generate a summarized dataset, wherein the size of the summarized dataset is smaller than the size of the original dataset, wherein each of at least some records in the summarized dataset represents a plurality of records in the original dataset;

training a computation model using data from the summarized dataset, wherein the computation model comprises an optimizer, wherein the training involves training the optimizer using data from the summarized dataset; and providing control in relation to the plurality of controllable assets using the trained computation model, wherein the providing control involves using the trained optimizer, and wherein the providing control using the trained optimizer involves scheduling of charging interactions for EVs.

19. The non-transitory computer-readable medium according to claim 18, wherein the computation model comprises a predictor, wherein the training involves training the predictor using data from the summarized dataset, and wherein the providing control involves using predictions generated by the trained predictor.

20. The non-transitory computer-readable medium according to claim 19, wherein the method further comprising generating predictions relating to charging interactions of EVs, wherein the providing control is based on the predictions relating to charging interactions of EVs.

* * * * *